US010976940B2

(12) United States Patent
Gupta et al.

(10) Patent No.: US 10,976,940 B2
(45) Date of Patent: *Apr. 13, 2021

(54) COPY SOURCE TO TARGET MANAGEMENT IN A DATA STORAGE SYSTEM

(71) Applicant: INTERNATIONAL BUSINESS MACHINES CORPORATION, Armonk, NY (US)

(72) Inventors: Lokesh M. Gupta, Tucson, AZ (US); Kevin J. Ash, Tucson, AZ (US); Clint A. Hardy, Tucson, AZ (US); Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,397

(22) Filed: Oct. 11, 2019

(65) Prior Publication Data

US 2020/0042206 A1 Feb. 6, 2020

Related U.S. Application Data

(63) Continuation of application No. 15/842,856, filed on Dec. 14, 2017, now Pat. No. 10,521,139.

(51) Int. Cl.
*G06F 3/06* (2006.01)
*G06F 12/0888* (2016.01)

(52) U.S. Cl.
CPC ............ *G06F 3/0619* (2013.01); *G06F 3/065* (2013.01); *G06F 3/067* (2013.01); *G06F 3/0665* (2013.01);
(Continued)

(58) Field of Classification Search
CPC ...... G06F 3/0619; G06F 3/065; G06F 3/0665; G06F 3/067; G06F 3/0689; G06F 3/061;
(Continued)

(56) References Cited

U.S. PATENT DOCUMENTS 6,338,114 B1 1/2002 Paulsen et al.
7,328,226 B1 2/2008 Karr et al.
(Continued)

FOREIGN PATENT DOCUMENTS

CN 1694074 A 11/2005
CN 103970623 A 8/2014

OTHER PUBLICATIONS

List of Patents and Applications Treated as Related, dated Oct. 11, 2019, Total 2 pages.
(Continued)

*Primary Examiner* — Hiep T Nguyen
(74) *Attorney, Agent, or Firm* — William K. Konrad; Konrad, Raynes, Davda and Victor LLP

(57) ABSTRACT

Copy source to target operations may be selectively and preemptively undertaken in advance of source destage operations. In another aspect, logic detects sequential writes including large block writes to point-in-time copy sources. In response, destage tasks on the associated point-in-time copy targets are started which include in one embodiment, stride-aligned copy source to target operations which copy unmodified data from the point-in-time copy sources to the point-in-time copy targets in alignment with the strides of the target. As a result, when write data of write operations is destaged to the point-in-time copy sources, such source destages do not need to wait for copy source to target operations since they have already been performed. In addition, the copy source to target operations may be stride-aligned with respect to the stride boundaries of the point-in-time copy targets. Other features and aspects may be realized, depending upon the particular application.

21 Claims, 9 Drawing Sheets

(52) U.S. Cl.
CPC .. *G06F 12/0888* (2013.01); *G06F 2212/6046* (2013.01)

(58) Field of Classification Search
CPC ............. G06F 12/0888; G06F 12/0868; G06F 2212/462; G06F 2212/286; G06F 2212/1016; G06F 2212/154; G06F 2212/263; G06F 2212/312
See application file for complete search history.

(56) References Cited

U.S. PATENT DOCUMENTS

| | | | |
|---|---|---|---|
| 9,354,994 | B2 | 5/2016 | Coronado et al. |
| 9,632,945 | B2 | 4/2017 | Ash et al. |
| 9,658,798 | B2 | 5/2017 | Ash et al. |
| 9,779,016 | B1* | 10/2017 | Shen .................. G06F 1/28 |
| 9,891,860 | B1 | 2/2018 | Delgado et al. |
| 10,521,139 | B2* | 12/2019 | Gupta ................ G06F 12/0868 |
| 2002/0191452 | A1 | 12/2002 | Fujihara |
| 2003/0233613 | A1 | 12/2003 | Ash et al. |
| 2007/0124345 | A1* | 5/2007 | Heinz ................ G06F 11/1464 |
| 2008/0049254 | A1* | 2/2008 | Phan .................... G06F 9/5072 358/1.16 |
| 2011/0072206 | A1* | 3/2011 | Ross .................. G06F 16/173 711/108 |
| 2012/0089795 | A1 | 4/2012 | Benhase et al. |
| 2012/0176698 | A1 | 7/2012 | Rub |
| 2012/0254547 | A1 | 10/2012 | Benhase et al. |
| 2012/0254566 | A1 | 10/2012 | Clayton et al. |
| 2012/0303872 | A1 | 11/2012 | Benhase et al. |
| 2013/0024626 | A1 | 1/2013 | Benhase et al. |
| 2013/0080703 | A1 | 3/2013 | Kumagai et al. |
| 2013/0080704 | A1 | 3/2013 | Brown et al. |
| 2013/0332646 | A1 | 12/2013 | Benhase et al. |
| 2014/0075114 | A1 | 3/2014 | Benhase et al. |
| 2015/0052288 | A1 | 2/2015 | Mirichigni et al. |
| 2015/0134914 | A1 | 5/2015 | Ash et al. |
| 2016/0062694 | A1 | 3/2016 | Makkar et al. |
| 2016/0299694 | A1 | 10/2016 | Ash et al. |
| 2018/0157697 | A1 | 6/2018 | Brown et al. |

OTHER PUBLICATIONS

U.S. Appl. No. 15/842,852, filed Dec. 14, 2017, Total 68 pages.
Office Action, dated Jan. 28, 2019, for U.S. Appl. No. 15/842,852, filed Dec. 14, 2017, invented by Lokesh M. Gupta et al., Total 35 pages.
Response to Office Action, dated Apr. 29, 2019, for U.S. Appl. No. 15/842,852, filed Dec. 14, 2017, invented by Lokesh M. Gupta et al.,Total 14 pages.
Final Office Action, dated Jun. 28, 2019, for U.S. Appl. No. 15/842,852, filed Dec. 14, 2017, invented by Lokesh M. Gupta et al.,Total 37 pages.
After Final Consideration Pilot Program Request, dated Aug. 14, 2019, for U.S. Appl. No. 15/842,852, filed Dec. 14, 2017, Invented by Lokesh M. Gupta et al.,Total 2 pages.
Response to Final Office Action, dated Sep. 17, 2019, for U.S. Appl. No. 15/842,852, filed Dec. 14, 2017, invented by Lokesh M. Gupta et al.,Total 17 pages.
U.S. Appl. No. 15/842,856, filed Dec. 14, 2017, Total 69 pages.
Office Action, dated Mar. 29, 2019, for U.S. Pat. No. 5,842,856, filed Dec. 14, 2017, Total 10 pages.
Response to Office Action, dated Jul. 1, 2019, for U.S. Pat. No. 5,842,856, filed Dec. 14, 2017, Total 13 pages.
Notice of Allowance, dated Aug. 21, 2019, for U.S. Pat. No. 5,842,856, filed Dec. 14, 2017, Total 12 pages.
Machine Translation of CN1694074A, published Nov. 9, 2005, Total 12 pages.
Machine Translation of CN103970623A, published Aug. 6, 2014, Total 14 pages.
International Search Report and Written Opinion, dated Mar. 20, 2019, for International Application No. PCT/IB2018/059451, filed Nov. 29, 2018, Total 9 pages.
"I/O Priority Management for Copy Services Relationships", IP.com, Prior Art Database Technical Disclosure, IP.com No. IPCOM000198983D, IP.com Electronic Publication Date: Aug. 19, 2010, pp. 5.
"Method to Improve the Write Response Time in Thin-Provisioning and Snapshot for Flash Storage Systems", IP.com, Prior Art Database Technical Disclosure, IP.com No. IPCOM000241760D IP.com Electronic Publication Date: May 28, 2015, pp. 4.
"Improved Flash Copy for Non-Cache Storage System", IP.com, Prior Art Database Technical Disclosure, IP.com No. IPCOM000249424D IP.com Electronic Publication Date: Feb. 27, 2017, pp. 5.
Office Action3, dated Oct. 29, 2019, for U.S. Appl. No. 15/842,852, filed Dec. 14, 2017, invented by Lokesh M. Gupta et al., Total 38 pages.
Response to OA3, dated Jan. 29, 2020, for U.S. Appl. No. 15/842,852, filed Dec. 14, 2017, invented by Lokesh M. Gupta et al.,Total 18 pages.
Notice of Allowance, dated Apr. 24, 2020, for U.S. Appl. No. 15/842,852, filed Dec. 14, 2017, invented by Lokesh M. Gupta at al.,Total 28 pages.
German Office Action, dated Feb. 2, 2021, Ref.: 11 2018 005 768.2, Total 5 pages.

* cited by examiner though a TCB is a TCB which controls
COPY SOURCE TO TARGET MANAGEMENT IN A DATA STORAGE SYSTEM

CROSS-REFERENCE TO RELATED APPLICATION

This application is a continuation of U.S. patent application Ser. No. 15/842,856, filed Dec. 14, 2017, which application is incorporated herein by reference in its entirety.

BACKGROUND OF THE INVENTION

Field of the Invention

The present invention relates to a computer program product, system, and method for copy source to target management in data storage systems.

Description of Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Accordingly, data from a host to be stored in the data storage system is typically directed to a primary device of a primary data storage system at a local site and then replicated to one or more secondary devices of secondary data storage systems which may be geographically remote systems from the primary data storage system. One primary device can have multiple secondary relationships in which data directed to a primary device is replicated to multiple secondary devices.

A storage controller may control a plurality of storage devices that may include hard disks, tapes, etc. A cache may also be maintained by the storage controller, where the cache may comprise a high speed storage that is accessible more quickly in comparison to certain other storage devices, such as, hard disks, tapes, etc. However, the total amount of storage capacity of the cache may be relatively small by comparison to the storage capacity of certain other storage devices, such as, hard disks, etc., that are controlled by the storage controller. The cache may be comprised of one or more of random access memory (RAM), non-volatile storage device (NVS), read cache, write cache, etc., that may interoperate with each other in different ways. The NVS may be comprised of a battery backed-up random access memory and may allow write operations to be performed at a high speed. The storage controller may manage Input/Output (I/O) requests from networked hosts to the plurality of storage devices.

Caching techniques implemented by the storage controller assist in hiding input/output (I/O) latency by reducing the effective time required to read data from or write data to a lower speed memory or storage device. Thus, the cache is used for rapid access to data staged from external storage to service read data access requests, and to provide buffering of modified data. Write requests are written to the cache and then written (i.e., destaged) to the external storage devices. To guarantee continued low latency for writes, the data in the NVS may have to be drained, that is destaged, so as to ensure that there is always some empty space for incoming writes.

A Task Control Block (TCB) is a task control data structure in the operating system kernel containing the information needed to manage a particular process. Storage controllers may move information to and from storage devices, and to and from the cache (including the NVS) by using TCBs to manage the movement of data. When a write request issues from a host computer to a storage controller, a TCB may be allocated from the operating system code. The TCB is used to maintain information about the write process from beginning to end as data to be written is passed from the host computer through the cache to the storage devices. If the cache is full, the TCB may be queued until existing data in the cache can be destaged (i.e., written to storage devices), in order to free up space. The destage operations may involve the moving of information from cache to storage such as Redundant Array of Independent Disks (RAID) storage and destage TCBs may be allocated for performing the destage operations.

TCBs may be classified on the basis of the task being controlled by the particular TCB. For example, a "background" TCB is a TCB that controls an operation which is not directly related to a host input/output operation. Thus, one example of a background TCB is a TCB which controls a destage operation as a background operation not required as part of a particular host I/O operation. Another example of a background TCB is a TCB which controls a prestage of tracks from storage to cache in which the prestage operation is being performed as a background operation not required as part of a particular host I/O operation.

Another type of TCB is a "foreground" TCB that controls an operation which is typically directly related to a host input/output operation. For example, a foreground TCB may be allocated to perform a destage or stage operation on behalf of a host I/0 operation. Thus, a cache miss on a host read typically causes a stage operation controlled by a foreground TCB, to stage one or more tracks from storage to cache to satisfy the host read operation.

Storage controllers frequently employ a safe data commit process which scans a cache directory for modified (often referred to as "dirty") data to be destaged to secondary storage. Such a scan of the cache directory may be initiated on a periodic basis, such as on the hour, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

A near instantaneous copy of a set of tracks may be generated using a point-in-time snap copy function such as the IBM® FlashCopy function, for example, which establishes a point-in-time copy relationship between a set of source tracks and a set of target tracks in a storage controller. The set of tracks of the copy relationship may comprise full volume or a logical unit (LUN) or parts of a volume, for example. Thus, if the set of tracks is a full volume, for example, the point-in-time snap copy function creates a "snapshot" of the contents of a source volume as of a particular time in a target volume which may be referred to as the point-in-time snap copy volume or simply point-in-time copy volume. One version of a point-in-time snap copy function transfers the contents of the point-in-time copy source volume to the point-in-time copy target volume in a background copy operation.

Any read operations directed to a track of the point-in-time copy target volume which has not yet received the contents of the corresponding track of the source volume, are redirected to obtain the contents of that track from the source volume. Accordingly, the contents of a point-in-time copy target volume are immediately available albeit indirectly, before any tracks have actually been transferred to the target volume. Conversely, if the host directs an update to a track of the source volume before the contents of that track have been transferred to the point-in-time copy target volume, the contents of the track of the source volume are transferred to the point-in-time copy target volume before the update is permitted to overwrite the contents of that track of the source volume.

Another version of a point-in-time snap copy function omits the background copy operation. Thus, the contents of the source volume are not transferred to the point-in-time copy volume in a background copy operation. Accordingly, any read operations directed to a track of the point-in-time copy target volume are usually redirected to obtain the contents of that track from the source volume. However, if the host directs an update to a track of the source volume, the unmodified contents of that track of the source volume are transferred to the point-in-time copy target volume before the update is permitted to overwrite the original, unmodified contents of that track of the source volume. Doing such a copy operation at the time of write is known as a "Copy on Write".

Data may be also copied from source to target when there is a destage to the source for data written to the cache after the point-in-time copy relationship was established, and is typically referred to as "Copy On destage". Known copy on destage operations can consume significant system resources. More specifically, the copy on destage operation first stages to cache old, unmodified data from the source of the point-in-time copy relationship and then destages from cache that old, unmodified data to the target of the point-in-time copy relationship. The destage of new, modified data from the cache to the source is then allowed to overwrite the old, unmodified day on the source. It is appreciated that such known copy on destage operations for point-in-time copy relationships can significantly slow destage operations to the source.

For sequential writes directed to the source of a point-in-time copy relationship, a "Copy On Destage" operation typically reads the old, unmodified data in a full stride of tracks from source, stages the stride of data to cache, and then destages the data of those tracks to the target of the point-in-time copy relationship. A stride is a set of tracks, typically sequential tracks, having well defined beginning and ending boundaries. Parity data such as RAID (Redundant Array of Independent Disks) parity data, for example, is computed based upon the data to be stored on the tracks within those boundaries and the parity data for the stride of tracks is also stored within the stride boundaries. Hence, read and write operations which are aligned with the boundaries of one or more strides, facilitate efficiency since read (decoding) and write (encoding) operations may be completed for stride parity data on a stride by stride basis.

Thus copy on destage operations are facilitated if the source and target strides are aligned. However, if the source and target strides do not align then destages on the target typically will not be stride-aligned with stride boundaries of the target notwithstanding that read operations from the source may be stride-aligned with the stride boundaries of the source. In various systems, it is difficult to create a configuration where source and target strides are aligned.

Hence, sequential I/O performance may be adversely impacted when there are point-in-time copy relationships in the storage controlled by a storage controller.

SUMMARY

One general aspect of a computing environment employing copy source to target management in accordance with the present description, is directed to sequential write detection logic detecting a sequential write operation to modify a set of data in a point-in-time copy source, and copy source to target logic initiating in response to the detecting, a stride-aligned copy source to target operation. In one embodiment, the stride-aligned copy source to target operation includes directing a stride-aligned read operation to a point-in-time copy target of the point-in-time copy source to force a redirected operation to the point-in-time copy source to obtain read data including the set of data, and writing stride-aligned data to the point-in-time copy target including the read set of data.

In another aspect, task control block generation logic generates a task control block data structure for controlling the copy source to target operation, the task control block having at least two input values including a starting track value and a number of tracks value. The stride-aligned read operation controlled by the task control block data structure, is directed to one or more strides of tracks which include a track identified by the starting track value followed a number of tracks identified by the number of tracks value.

In another aspect, in which the point-in-time copy source is in a one-to-plural copy relationship with a plurality of point-in-time copy targets, copy source to target logic initiates a sequence of the copy source to target operations including a copy source to target operation of the sequence for each point-in-time copy target of the copy relationship. Task control block generation logic generates task control block data structures, each task control block data structure controlling a copy source to target operation of the sequence of copy source to target operations, one at a time.

Still another aspect is directed to sequential write detection logic detecting a sequential write operation by checking every Nth track of the write operation and determining whether the write operation is a sequential write operation. In another embodiment, sequential write detection logic detects a sequential write operation by determining whether a host which initiated the write operation has specified the write operation as a sequential write operation. In yet another embodiment, in which a write operation includes writing tracks of data in cache, sequential write detection logic detects a sequential write operation by inspecting previously written tracks in the cache to determine if the tracks of the write operation are in sequence. In still another embodiment, the sequential write detection logic detects a sequential write operation by determining when the write operation to cache is complete and inspecting written tracks in the cache to determine if the tracks written to cache are in sequence.

In another aspect of the present description, safe data commit logic initiates a safe data commit scan of cache to identify tracks of modified data to destage to storage and bypasses destaging of the tracks of modified data in cache of the sequential write operation. Task control block generation logic generates a task control block data structure for controlling the copy source to target operation, so that the stride-aligned read operation of the copy source to target operation includes tracks of the point-in-time copy target corresponding to the bypassed tracks in cache.

Another general aspect of a computing environment employing copy source to target management in accordance with the present description, is directed to preemptive condition monitoring logic determining whether conditions for preemptive copy source to target operations are present for modified data in cache, and copy source to target logic which, in response to a determination that conditions for preemptive copy source to target operations are present, preemptively and selectively initiating a copy source to target operation. In one embodiment, the copy source to target operation includes reading the point-in-time copy source to obtain read data including the unmodified set of data, and writing the unmodified set of data to the point-in-time copy target. Safe data commit logic initiates a scan of cache to identify tracks of modified data in cache to destage to storage.

In one embodiment, preemptive condition monitoring logic determines whether conditions for preemptive copy source to target operation are present an interval of time prior to initiation of a safe data commit scan of cache to identify tracks of modified data in cache to destage to storage. In another embodiment, preemptive condition monitoring logic determines whether conditions for preemptive copy source to target operation are present as a function of whether a point-in-time copy relationship from the point-in-time copy source to the point-in-time copy target is persistent or the point-in-time of the copy relationship has been incremented. In one embodiment, preemptive condition monitoring logic determines that conditions for preemptive copy source to target operation are present if the point-in-time copy relationship from the point-in-time copy source to the point-in-time copy target is persistent.

In yet another embodiment in which writing a modified set of data in cache includes writing modified data in tracks, preemptive condition monitoring logic determines whether conditions for preemptive copy source to target operation are present as a function of whether the number of tracks of modified data in cache which correspond to a point-in-time copy source, exceeds a threshold value. In one embodiment, preemptive condition monitoring logic determines that conditions for preemptive copy source to target operation are present if the number of tracks of modified data in cache which correspond to a point-in-time copy source, exceeds the threshold value.

Yet another embodiment is directed to preemptive scan logic which, in response to a determination that conditions for preemptive copy source to target operation are present, initiates a scan of tracks of modified data in cache to identify tracks of modified data which a) correspond to a point-in-time copy source, and b) have not yet been copied to a corresponding point-in-time copy target of the point-in-time source. The preemptive scan logic selectively and preemptively causes the copy source to target logic to initiate a copy source to target operation for identified tracks in cache meeting these conditions.

Still another embodiment is directed to sequential write detection logic detecting if identified tracks in cache are sequential. Copy source to target logic, in response to detection of identified sequential tracks, preemptively and selectively directs a stride-aligned read operation to a point-in-time copy target of the point-in-time copy source. The stride-aligned read operation to a point-in-time copy target forces a redirected read operation to the point-in-time copy source to obtain unmodified data corresponding to the identified sequential tracks of modified data in cache. Copy source to target logic writes stride-aligned tracks of sequential data to the point-in-time copy target including the obtained unmodified data corresponding to the identified sequential tracks of modified data in cache. Yet another embodiment is directed to preemptive scan logic bypassing scanning of remaining tracks corresponding to the stride-aligned read operation.

Another aspect of copy source to target management in accordance with the present description is directed to employment in a system having a host configured to initiate input/output operations, a storage controller having a processor and a cache, and storage controlled by the storage controller, the storage including a point-in-time copy source and a point-in-time copy target.

Implementations of the described techniques may include hardware, a method or process, or computer software on a computer-accessible medium. Other features and aspects may be realized, depending upon the particular application.

DETAILED DESCRIPTION

Figure 1:
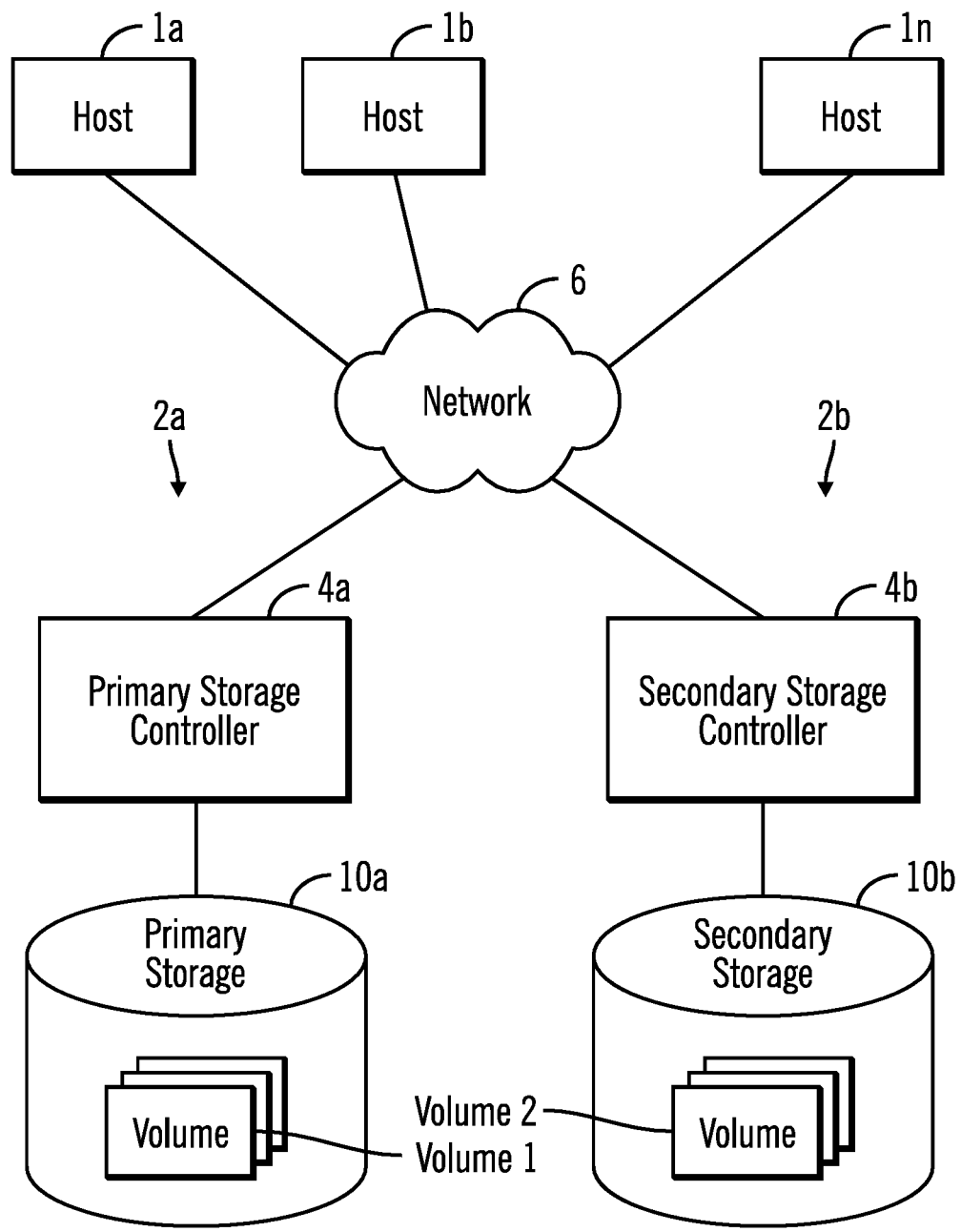
FIG. 1 illustrates an embodiment of a computing environment employing copy source to target management in a data storage system in accordance with one aspect of the present description.

Absent copy source to target (CST) management in accordance with the present description, a known "Copy on Destage" operation can cause significant degradation in system performance under various conditions. For example, as explained above, a known copy on destage operation can consume significant system resources. More specifically, the copy on destage operation first stages to cache old, unmodified data from the source of the point-in-time copy relationship and then destages from cache that old, unmodified data to the target of the point-in-time copy relationship. The destage of new, modified data on the source is then allowed to overwrite the old, unmodified day on the source. It is appreciated that such copy on destage operations can significantly slow destage operations to the source. Hence, system performance may be degraded when cache contains modified data for tracks which belong to point-in-time copy relationships.

As explained in greater detail below, in one aspect of copy source to target (CST) management in accordance with the present description, copy source to target operations may be preemptively undertaken in advance of source destage operations. As a result, the copying of old, unmodified data from the source to the target has already been accomplished by the time source destage operations are initiated. Consequently the source destage operations need not be delayed by waiting for the copying of old, unmodified data from the source to the target to be completed.

In another aspect of copy source to target (CST) management in accordance with the present description, preemptive copy source to target operations may be selectively undertaken in advance of source destage operations. For example, such preemptive copy source to target operations may be selectively undertaken when it is determined that conditions for preemptive copy source to target operations are present such that preemptive copy source to target operations may preserve needed data before it is overwritten by source destage operations. Conversely, such preemptive copy source to target operations may be bypassed when it is determined that conditions for preemptive copy source to target operations are not present such that preemptive copy source to target operations are not needed to preserve data before it is overwritten by source destage operations. As a result, system performance may be improved by preemptive copy source to target operations when needed but not degraded when such preemptive copy source to target operations are not needed.

As previously noted, for destages of sequential writes to the copy source, known "Copy On Destage" operations read a stride from the copy source and then destage those tracks to the copy target. If the source and target strides align, efficiency is facilitated. However, if the source and target strides do not align then destages on the target frequently will not be full strides in known copy on destage operations which can significantly adversely affect performance. For example, to generate new strides to write to the target, additional data from the source or target may be needed to complete the strides for the target.

In another aspect of the present description, logic is configured to detect sequential writes including large block writes directed to point-in-time copy sources and in response, start destage tasks on the associated point-in-time copy targets. As explained in greater detail below, the destage tasks include in one embodiment, stride-aligned copy source to target operations which copy unmodified data from the point-in-time copy sources to the point-in-time copy targets prior to overwriting of the unmodified data in the point-in-time copy sources in subsequent copy source destaging operations. As a result, when the sequential write data of the sequential write operations are destaged to the point-in-time copy sources, such source destages do not need to wait for copy source to target operations since they have already been performed. In addition, the copy source to target operations are stride-aligned with respect to the stride boundaries of the point-in-time copy targets. As a result, the sequential write operations to the point-in-time copy sources in source destage operations and the sequential write operations to the point-in-time copy targets in target destage operations, are both stride-aligned with respect to the respective stride boundaries of the source and target volumes. Hence, degradation of sequential I/O performance when there are point-in-time copies in the storage controller, may be reduced or eliminated. Other aspects and advantages may be realized, depending upon the particular application.

A system of one or more computers may be configured for copy source to target management in a data storage system in accordance with the present description, by virtue of having software, firmware, hardware, or a combination of them installed on the system that in operation causes or cause the system to perform copy source to target operations in accordance with the present description. For example, one or more computer programs may be configured to perform copy source to target management in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
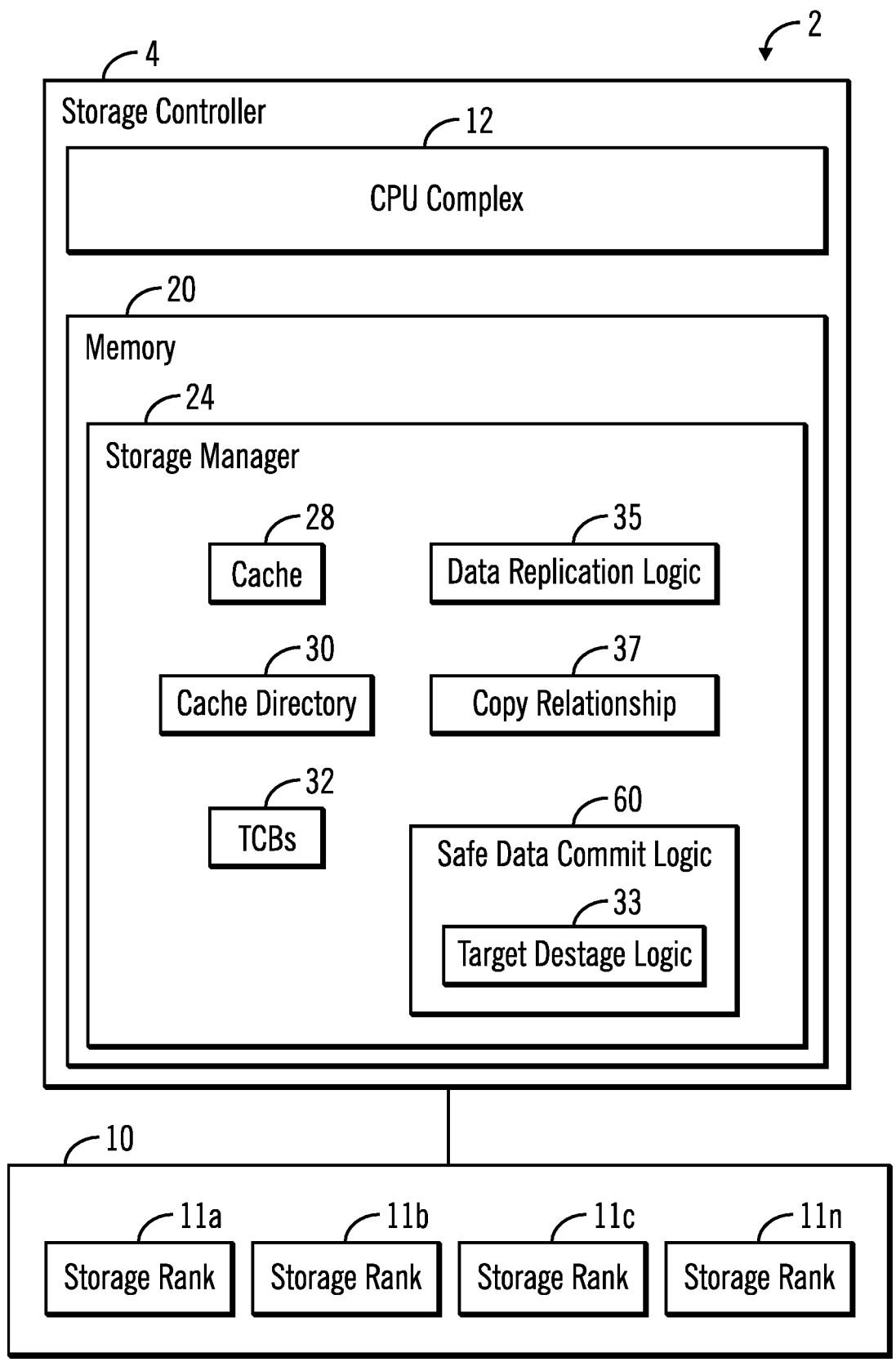
FIG. 2 illustrates an example of a data storage system employing copy source to target management in the computing environment of FIG. 1.

Implementations of the described techniques may include hardware, a method or process, or computer software on a computer-accessible medium. FIGS. 1, 2 illustrate an embodiment of a computing environment employing copy source to target management in a data storage system in accordance with the present description. A plurality of hosts 1a, 1b . . . 1n may submit Input/Output (I/O) requests over a network 6 to one or more data storage devices or systems 2a, 2b, 2 (FIG. 2) to read or write data. The hosts 1a, 1b . . . 1n may be separate physical devices or may be virtual devices implemented using assigned resources of partitions of a server, for example. In a similar manner, the data storage system or systems 2 (FIG. 2), 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

Each data storage system 2 (FIG. 2), 2a, 2b includes a storage controller or control unit 4 (FIG. 2), 4a, 4b, respectively, which accesses data stored in a plurality of data storage units of storage 10, 10a, 10b, respectively. Each data storage unit of the storage 10, 10a, 10b may comprise any suitable device capable of storing data, such as physical hard disks, solid state drives, etc., known in the art. Thus, in one embodiment, the storage 10, 10a, 10b may be comprised of one or more sequential access storage devices, such as hard disk drives and magnetic tape or may include non-sequential access storage devices such as solid state drives (SSD), for example. Each device of storage 10 (FIG. 2), 10a, 10b may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments, for example, storage units may be disks that are configured as a Redundant Array of Independent Disk (RAID) storage ranks 11a (FIG. 2), . . . 11n, in which one or more RAID storage rank is an array of hard disks in a RAID configuration to facilitate data recovery in the event of loss of a hard disk. The storage units of the storage 10, 10a, 10b may also be other types of storage such as solid state drives in a RAID configuration to facilitate data recovery in the event of loss of a solid state drive. The storage units of the storage 10 (FIG. 2), 10a, 10b may be configured to store data in subunits of data storage such as volumes, extents, strides, tracks, etc.

Each storage controller 4 (FIG. 2), 4a, 4b includes a CPU complex 12 (FIG. 2) including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a, 4b further has a memory 20 that includes a storage manager 24 for managing storage operations including writing data to or reading data from an associated storage 10 (FIG. 2), 10a, 10b in response to an I/O data request from a host or mirrored data from another data storage system. A cache 28 of the memory 20 may comprise one or more of different types of memory, such as RAMs, write caches, read caches, NVS, etc. The different types of memory that comprise the cache may interoperate with each other. The CPU complex 12 of each storage controller 4 (FIG. 2), 4a, 4b may have multiple clusters of processors, each cluster having its own assigned memory 20, storage manager 24, cache 28, etc. The processing and memory resources assigned each cluster may be physical, virtual, shared, transferrable or dedicated, depending upon the particular application.

Writes from the hosts 1a . . . 1n may initially be written to a cache 28 of the primary storage controller 4a and then later destaged to the storage 10a of the primary storage system 2a. Read requests from the hosts 1a . . . 1n may be satisfied from a cache 28 of the primary storage controller 4a if the corresponding information is available in that cache 28, otherwise the information is staged from the storage 10a to the cache 28 and then provided to the requesting host 1a . . . 1n.

Writes from the hosts 1a . . . 1n initially written to the cache 28 and the storage 10a of the primary storage controller 4a, may be mirrored by a storage manager 24 of the primary storage controller 4a to the secondary storage controller 4b. Mirrored data may initially be written to a cache 28 of the secondary storage controller 4b and then later destaged to the storage 10b controlled by the secondary storage controller 4b of the secondary storage system 2b.

The memory 20 of the storage controller 4 (FIG. 2), 4a, 4b includes a cache directory 30 which identifies tracks having data stored in the cache 28 as a result of a prestage or stage operation which transfers the data of a track stored in the storage 10 (FIG. 2), 10a, 10b to the cache 28, or as a result of a host write operation which writes data to the cache 28 for subsequent destaging to the corresponding track or tracks of the storage 10 (FIG. 2), 10a, 10b. In the illustrated embodiment, the cache directory 30 is implemented in the form of a known data structure which is a hash table of all tracks in cache 28. Each track is hashed into a slot of the cache directory 30 which includes a track identification (ID) and an indication as to whether the data of the track is "dirty", that is, has not yet been safely destaged to the corresponding track of the storage 10 (FIG. 2), 10a, 10b. Multiple tracks hashed into a slot are linked together. It is appreciated that a suitable cache directory may be implemented using other types of data structures.

Operations including I/O operations of the storage manager 24, including cache write, stage, prestage and destage operations, for example, utilize Task Control Blocks (TCBs) 32 of the memory 20. Each TCB is a data structure in the operating system kernel containing the information needed to manage a particular process. Storage controllers may move information to and from storage, and to and from the cache by using TCBs to manage the movement of data. When a write request issues from a host to a storage controller or data is mirrored from the primary data storage system to a secondary data storage system, a TCB may be allocated from the operating system code. The TCB is used to maintain information about the write process from beginning to end as data to be written is passed from the source through the cache to the storage. If the cache is full, the TCB may be queued until existing data in the cache can be destaged (i.e., written to storage), in order to free up space.

In one aspect of the present description, the storage manager 24 includes target destage logic 33 which is configured to detect sequential writes including large block writes to point-in-time copy source volumes and in response, start destage tasks on the associated point-in-time copy targets. As explained in greater detail below, the destage tasks include in one embodiment, stride-aligned copy source to target operations which copy unmodified data from the point-in-time copy sources to the point-in-time copy targets prior to overwriting of the unmodified data in the point-in-time copy sources in subsequent copy source destaging operations.

In another aspect of the present description, the target destage logic 33 is further configured to selectively and preemptively perform copy source to target operations, depending upon conditions which indicate whether such copy source to target operations are appropriate or have been obviated by other occurrences. For example, these conditions in which copy source to target operations remain appropriate to copy unmodified data from a point-in-time copy source to a point-in-time copy target prior to overwriting of such unmodified data due to a write operation directed to the point-in-time copy source, include instances in which a safe data commit scan has been initiated or is imminent. Other examples of conditions for preemptive copy source to target operations include the presence in cache of tracks belonging to a persistent point-in-time copy relationship in contrast to a copy relationship which has been incremented such that prior uncopied data is no longer needed to be preserved prior to overwriting in a destage operation to the point-in-time copy source of the relationship.

Another example in which conditions for preemptive copy source to target operations may be present include instances in which the number of tracks of modified data in cache which belong to a point-in-time copy relationship, exceeds a threshold which has been set. When one or more of these or other conditions are met, preemptive copy source to target operations may be particularly useful to improve system performance by preemptively preserving unmodified data by copying it from the point-in-time copy source to the point-in-time copy target prior to the data being overwritten in destage operations to the copy sources. Hence, the subsequent source destage operations need not wait for a copy source to target operation to preserve unmodified data before it is overwritten by the source destage since the preservation of the unmodified data has already been completed preemptively. Conversely, if conditions for preemptive copy source to target operations are determined not to be present, preemptive copy source to target operations may be bypassed.

Figure 3A:
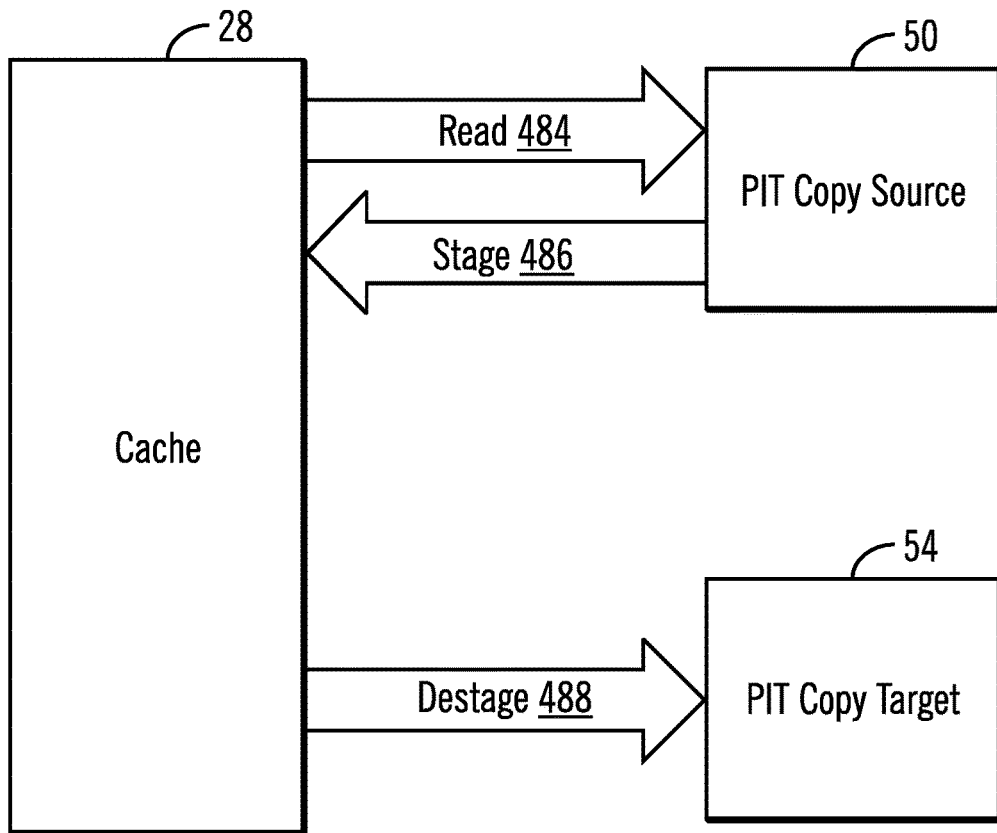
FIGS. 3A and 3B depict two examples of copy source to target operations which may be utilized in a computing environment employing copy source to target management in a data storage system in accordance with one aspect of the present description.

The storage manager 24 further includes a data replication logic 35 (FIG. 2) which is configured to generate point-in-time copies pursuant to a point-in-time copy relationship 37 between a point-in-time copy source and a point-in-time copy target. FIG. 3A shows an example of a point-in-time copy relationship established between a set of source tracks of a point-in-time copy source such as the source 50 of the storage 10 (FIG. 2) and a corresponding set of target tracks of a point-in-time copy target such as the target 54 which may also be in the storage 10 controlled by a storage controller such as the controller 4 (FIG. 2). Tracks of a point-in-time copy relationship may comprise for example, a full volume or logical unit (LUN), parts of a volume, or other units or subunits of storage.

In a typical point-in-time copy relationship, the data is usually not copied from source 50 to target 54 when the relationship is established. Instead, data can be copied from source 50 to target 54 using a background copy process or in connection with a destage on the source 50 of data written to cache after the point-in-time copy relationship was established. One known copy operation which copies data from a source to a target of a point-in-time copy relationship in connection with destage operation to be performed on the source, is often referred to as "Copy On Destage". Absent copy source to target management in accordance with the present description, a known "Copy on Destage" operation can cause significant degradation in system performance under various conditions. As explained in greater detail below, in one aspect of copy source to target management in accordance with the present description, target destage logic 33 (FIG. 2) selectively and preemptively undertakes copy source to target operations in advance of source destage operations. As a result, the copying of old, unmodified data from the source to the target has already been accomplished by the time source destage operations are initiated. Consequently the source destage operations need not be delayed by waiting for the copying of old, unmodified data from the source to the target to be completed.

Another example of copy source to target management in accordance with the present description is directed to sequential writes intended for a point-in-time copy source. Known copy on destage operations performed in connection with sequential write operations, typically read a stride of tracks of old, unmodified data from source and then destage those tracks to the target. Efficiency in such operations is facilitated if the source and target strides are in alignment. However, if the source and target strides do not align, then destages of the old, unmodified data on the target will typically not be in full strides, thereby adversely affecting system performance. It is noted that in many systems, it may be difficult to configure the system so that both source and target strides are aligned. As a result, system performance may be degraded when modified data is written to tracks in cache when affect point-in-time copy relationships.

In one aspect of the present description, the target destage logic 33 (FIG. 2) detects sequential writes including large block writes to point-in-time copy source volumes and in response, starts destage tasks on the associated point-in-time copy targets. The destage tasks include in one embodiment, stride-aligned copy source to target operations which copy unmodified data from the point-in-time copy sources to the point-in-time copy targets prior to overwriting of the unmodified data in the point-in-time copy sources in subsequent copy source destaging operations.

The data replication logic 35 (FIG. 2) of the storage manager 24 is further configured to synchronously (or asynchronously in some embodiments) generate copies of the primary volume1 (FIG. 1) of the primary data storage system 2a as a secondary volume2 (FIG. 1) of the secondary data storage systems as represented by the secondary data storage system 2b. A primary-secondary pair of volumes, volume1, volume2 are in an synchronous copy or mirror relationship 37 such that updates to the primary volume1 are synchronously mirrored to each secondary volume2. Such mirroring may also be performed asynchronously in some embodiments.

In the configuration illustrated in FIG. 1, the storage controller 4a and the data storage drive 10a have been configured as a primary storage control unit and the primary storage, respectively, of a primary data storage system 2a. Similarly, the storage controller 4b and its data storage drive 10b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage drive 10a will be referred to as a primary storage drive 10a. Similarly, the storage controller or control unit 4b will be referred to as a secondary storage controller or control unit 4b and the data storage drive 10b will be referred to as a secondary data storage drive 10b. In this embodiment, there may be multiple secondary data storages such that a copy relation can be in a one to many relationship, which is also referred to as a multi-target relationship.

In a particular copy relationship, the source unit is often referred to as the primary and the target unit is often referred to as the secondary. Replication relationships are defined between storage units of the primary data storage drive 10a and the secondary data storage drives 10b. Notwithstanding a reference to the data storage drive 10a as "primary" and the data storage 10b as "secondary," particular storage units of the data storages 10a, 10b, may play both a primary (or source role) and a secondary (or target role) depending upon the particular copy relationship.

In one embodiment, the storage devices 10, 10a, 10b, may be comprised of one or more sequential access storage devices, such as hard disk drives and magnetic tape or may include non-sequential access storage devices such as solid state drives (SSD), for example. Each storage device 10, 10a, 10b, may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The storage manager 24 further includes safe data commit logic 60 which periodically scans the cache directory 30 for dirty data to be destaged to storage 10 (FIG. 2), 10a, 10b (FIG. 1). The safe data commit process permits an operator to be assured that anything written to cache 28 prior to the safe data commit scan start time has been successfully destaged and safely stored on the storage 10 (FIG. 2), 10a, 10b (FIG. 1).

In the illustrated embodiment, the storage manager 24 including the target destage logic 33, is depicted as software stored in the memory 20 and executed by the CPU complex 12. However, it is appreciated that the logic functions of the storage manager 24 may be implemented as hardware, software, firmware or combinations of one or more thereof, depending upon the particular application.

The storage manager 24 (FIG. 2) in one embodiment may store data in the cache 28 and transfer data between the cache 28 and storage 10 (FIG. 2), 10a, 10b (FIG. 1) in tracks. In writing a track to cache, a TCB allocates one or more segments of cache storage to write the track. Similarly, the storage manager 24 (FIG. 2) in one embodiment may transfer data from the primary storage drive 10a (FIG. a) to a secondary storage drive 10b in tracks. As used herein, the term track may refer to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, stride, logical device, etc. or any portion thereof, or other subunits suitable for transfer or storage. Accordingly, the size of subunits of data processed in cache write and safe data commit processes in accordance with the present description may vary, depending upon the particular application. Thus, as used herein, the term "track" refers to any suitable subunit of data storage or transfer.

The system components 1a (FIG. 1), 1b . . . 1n, 4 (FIG. 2), 6 are connected to a network 6 which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
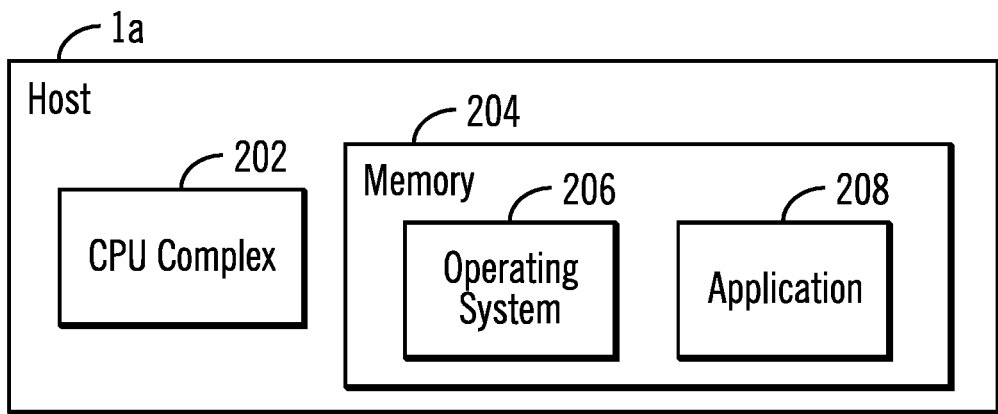
FIG. 4 illustrates an example of a host in the computing environment of FIG. 1.

A typical host as represented by the host 1a of FIG. 4 includes a CPU complex 202 and a memory 204 having an operating system 206 and an application 208 that cooperate to read data from and write data updates to the storage 10 (FIG. 2), 10a, 10b via a storage controller 4, 4a, 4b. An example of a suitable operating system is the z/OS operating system. It is appreciated that other types of operating systems may be employed, depending upon the particular application.

Figure 3B:
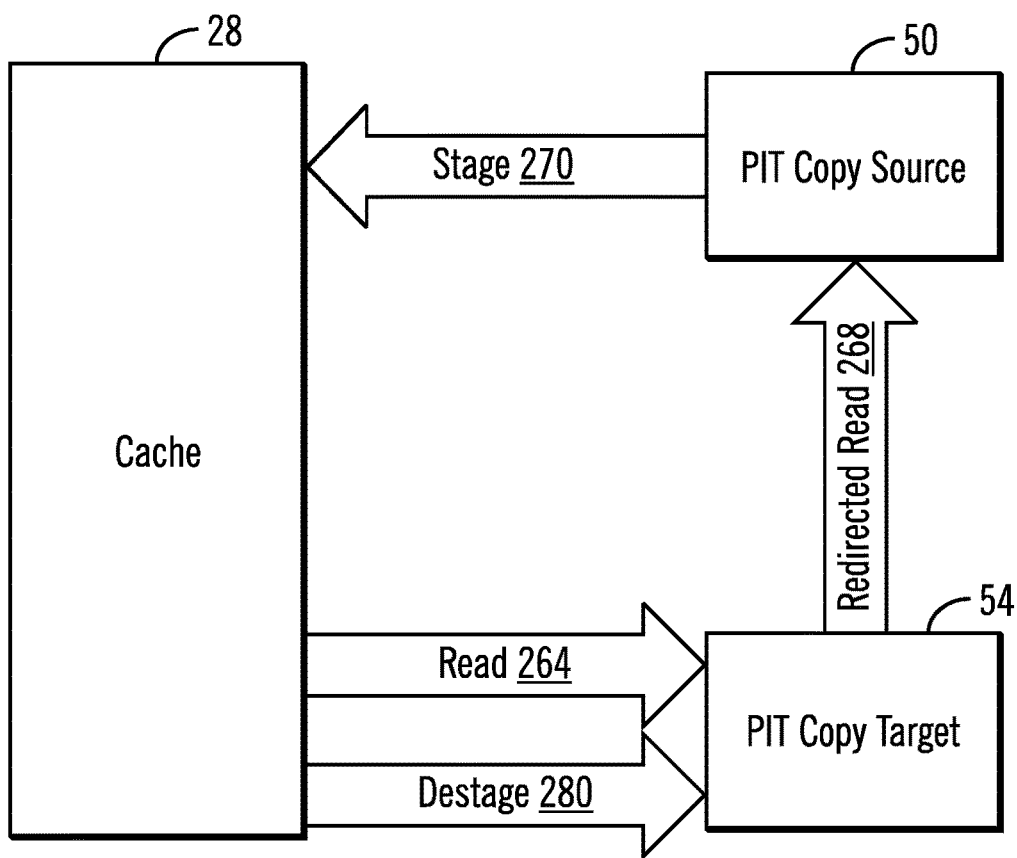
Figure 5:
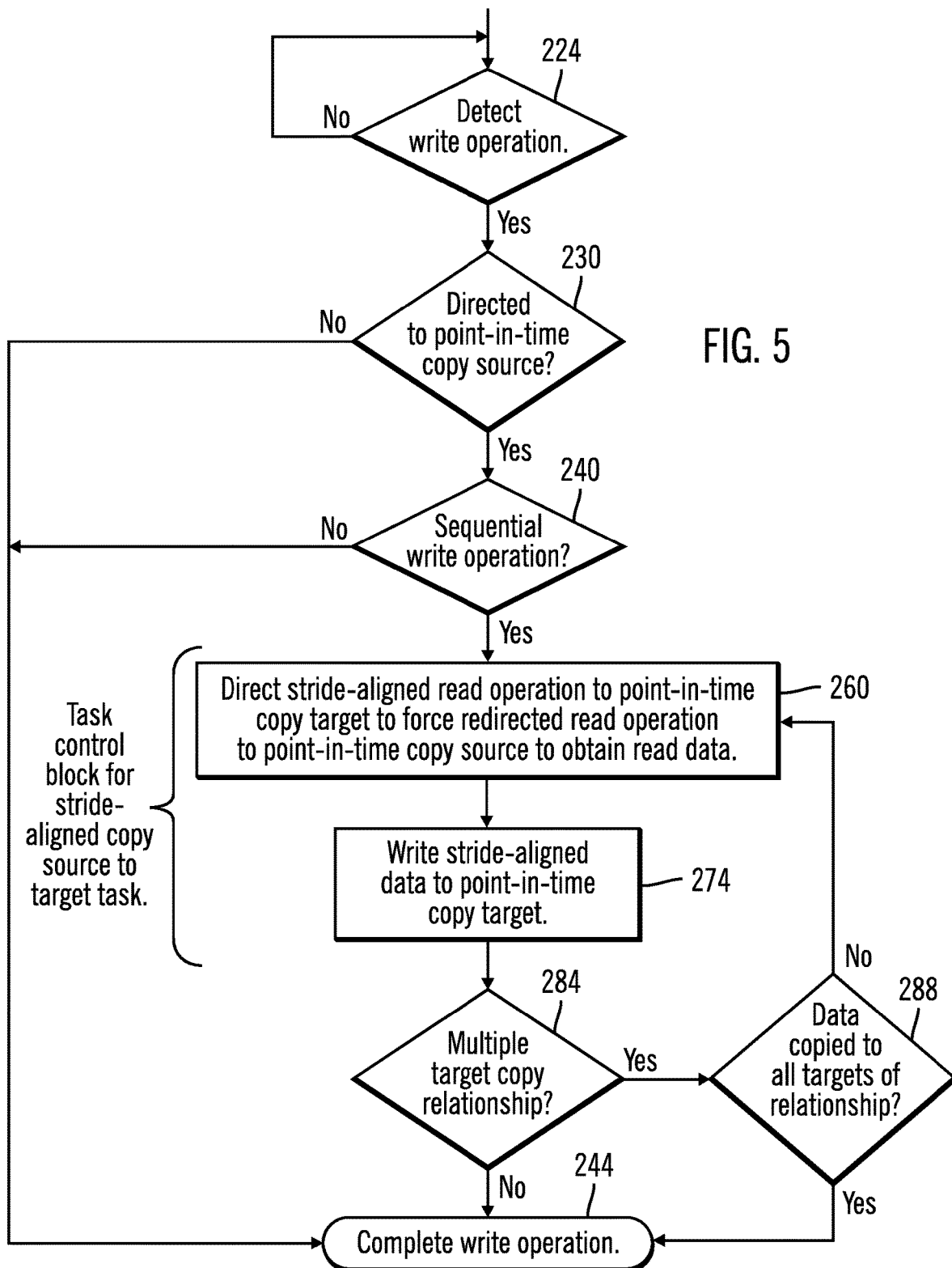
FIG. 5 illustrates an example of sequential write copy source to target operations in accordance with one aspect of the present description.

FIG. 5 depicts one example of operations of a copy source to target logic 214 (FIG. 6) of the target destage logic 33 in connection with a sequential write operation for writing sequential data to a point-in-time copy source. In this embodiment, the copy source to target logic 214 is configured to perform a copy source to target operation in which original, unmodified sequential data is read from the point-in-time copy source 50 (FIG. 3B) before the original, unmodified data of the source 50 is overwritten by a subsequent source destage operation which destages the sequential write data of the write operation from the cache 28 (FIG. 2) to the point-in-time copy source 50 (FIG. 3B). The original, unmodified data read from the point-in-time copy source 50 is destaged to the point-in-time copy target 54 in alignment with strides of the target 54. A subsequent source destage operation destages the sequential write data of the write operation from the cache 28 (FIG. 2) to the point-in-time copy source 50, again in alignment with the strides of the source 50. The copy source to target operation is in this embodiment, controlled by a task control block data structure, an example of which is the copy source to target TCB 218 of FIG. 7.

As explained in greater detail below, in this embodiment, there are various conditions in which a stride-aligned copy source to target operation such as that depicted in FIG. 3B may have applicability. These conditions include detecting a write operation and determining whether the write operation is a sequential write operation to eventually write to sequential tracks of the point-in-time copy source.

In the illustrated embodiment, the copy source to target logic 214 is configured to detect (block 224, FIG. 5) a write operation to the cache 28 (FIG. 2). For a detected write operation, the copy source to target logic 214 is further configured to determine (block 230, FIG. 5) whether the detected write operation is directed to a point-in-time copy source such as the source 50 of FIG. 3B. For a write operation directed to a point-in-time copy source, the copy source to target logic 214 further includes sequential write detection logic 234 (FIG. 6) which is configured to detect (block 240, FIG. 5) whether the detected write operation is a sequential write operation.

If the detected write operation is determined (block 230, FIG. 5) not to be directed to a point-in-time copy source or is detected (block 240, FIG. 5) to not be a sequential write operation, the detected write operation may subsequently be completed (block 244, FIG. 5) without performing a stride-aligned copy source to target operation similar to that depicted in FIG. 3B. For example, the write data of the write operation may be written to cache and subsequently destaged to storage without performing a stride-aligned copy source to target operation similar to that depicted in FIG. 3B. However, as described below in connection with FIGS. 9 and 10 and another aspect of the present description, a non-sequential copy source to target operation may nonetheless be preemptively performed if various conditions are met.

It is appreciated that there are a variety of known techniques for determining whether a write operation is a sequential write operation of a sequence of write operations in which the sequence of write operations write data to sequential tracks. In addition, techniques for determining whether a write operation is a sequential write operation may be modified as appropriate in accordance with the present description.

In one embodiment, the sequential write detection logic 234 (FIG. 6) is configured to periodically check whether the write operation is a sequential write operation. For example, the sequential write detection logic 234 (FIG. 6) may be configured to check on every Nth track being written and determine whether the write operation is a sequential write operation. The Nth track may be selected, for example, to coincide with the last track of the stride of the point-in-time copy source to which the write operation is ultimately directed.

As another example, the sequential write detection logic 234 (FIG. 6) may be configured to determine whether a host such as a host 1a (FIG. 4) for example, which initiated the write operation, has specified the write operation as a sequential write operation. As another example, the sequential write detection logic 234 (FIG. 6) may be configured to inspect previously written tracks in the cache to determine if the tracks of the write operation are sequential. In this manner, sequential write operations which write a large block of modified data in cache may be detected by the sequential write detection logic 234. In yet another example, the sequential write detection logic 234 (FIG. 6) may be configured to determine when the write to cache is complete for a write operation and inspect written tracks in the cache to determine if the tracks written to cache are in sequence.

If the detected write operation is determined (block 230, FIG. 5) to be directed to a point-in-time copy source and is detected (block 240, FIG. 5) to be a sequential write operation, a stride-aligned copy source to target operation similar to that depicted in FIG. 3B may be performed prior to completing (block 244, FIG. 5) the detected write operation. In the illustrated embodiment, a stride-aligned copy source to target operation may be controlled by a task control block data structure such as the TCB 218 of FIG. 7, for example. Accordingly, a task control block generation logic 250 (FIG. 6) of the copy source to target logic 214, is configured to generate a task control block data structure for controlling the stride-aligned copy source to target operation of FIG. 3B. In the illustrated embodiment, the task control block 218 has a plurality of fields 254, 258 configured to store at least two input values including a starting track value S (field 254) and a number of tracks value N (field 258) to identify the sequence of tracks of a stride-aligned copy source to target operation.

The copy source to target logic 214 (FIG. 6) is configured to initiate a stride-aligned copy source to target operation (FIG. 3B) using a task control block 218 (FIG. 7) wherein the stride-aligned copy source to target operation includes directing (block 260, FIG. 5) a stride aligned read operation 264 (FIG. 3B) to a point-in-time copy target 54 (FIG. 3B) of the point-in-time copy source 50 (FIG. 3B). Thus, the read operation 264 is aligned with the stride boundaries of the strides of the point-in-time copy target 54. However, the data of the read operation has not yet been copied to the point-in-time copy target 54. Accordingly, the stride-aligned read operation 264 to the target 54 forces a redirected read operation 268 (FIG. 3B) to the point-in-time copy source 50 to obtain unmodified read data including the set of data identified by the starting track value S (field 254, FIG. 7) and the number of tracks value N (field 258, FIG. 7)) for a sequence of tracks of original, unmodified data from the point-in-time copy source 50 (FIG. 3B). The sequence of tracks of the source 50 containing the unmodified data correspond to the tracks of modified data written to cache by the sequential write operation. However, because the read operation 264 is stride-aligned with the strides of the point-in-time copy target 54, the data being read by the redirected read operation 268 includes not only the read data identified by the TCB 218 (FIG. 7) which identifies the starting track value S (field 254, FIG. 7) and the number of tracks value N (field 258, FIG. 7)) for a sequence of tracks of original, unmodified data to be read, but may also include any additional tracks of a stride before or after the tracks identified by the TCB 218 to ensure that the tracks of the redirected read operation 268 may be readily stride aligned with the tracks of the point-in-time copy target 54 when the read data is subsequently destage to the target 54.

The unmodified data read from the source 50 pursuant to the redirected read operation 268 is staged as represented by the stage operation 270 (FIG. 3B) in the cache 28 by the copy source to target logic 214. The copy source to target logic 214 is further configured to write (block 274, FIG. 5), as represented by the destage operation 280 (FIG. 3B), the unmodified data read from the source 50, to the target 54 from the cache 28. The data read from the source 50 and destaged to the target 54 will be stride-aligned with respect to the strides of the target 54 since the redirected read operation 268 was stride aligned with the tracks of the point-in-time copy target 54.

In some embodiments, the point-in-time copy source may be in a one to plural point-in-time copy relationship with multiple point-in-time copy targets. Accordingly, in one embodiment, the copy source to target logic 214 (FIG. 6) may be further configured to determine (block 284, FIG. 5) whether the source is in a one to plural point-in-time copy relationship with multiple point-in-time copy targets. If so, the copy source to target logic 214 (FIG. 6) may be further configured to determine (block 288, FIG. 5) whether a stride-aligned copy source to target operation has been completed for each target of the one-to-plural point-in-time copy relationship. If not, the copy source to target logic 214 (FIG. 6) may be further configured to initiate and repeat a stride-aligned copy source to target operation (blocks 260, 274) for each such target of the relationship.

In this manner, a sequence of stride-aligned copy source to target operations are performed including a copy source to target operation of the sequence for each point-in-time copy target of the copy relationship. Accordingly, task control block generation logic 250 (FIG. 6) may be configured to generate a sequence of task control block data structures similar to the TCB 218 (FIG. 7), each task control block data structure of the sequence controlling a stride-aligned copy source to target operation of the sequence of copy source to target operations, one at a time.

Once it is determined (block 284, FIG. 5) that the detected write operation is not directed to a source in multiple target copy relationship, or it is determined (block 288) that data has been copied to all targets of the one-to-plural copy relationship, the detected write operation may be completed (block 244, FIG. 5) following completion of the stride-aligned copy source to target operation or operations for the target or targets of the point-in-time copy relationship. For example, the write data of the write operation which has been written to cache may be subsequently destaged to the copy source following completion of the stride-aligned copy source to target operation or operations in a manner similar to that depicted in FIG. 3B.

As explained in greater detail below in connection with FIG. 8, a determination of whether to perform a stride-aligned copy source to target operation similar to that depicted in FIG. 3B, may be made in connection with a safe data commit scan by the safe data commit logic 60 (FIG. 2), in which the cache is scanned for tracks of modified data to be destaged to storage. Accordingly, the safe data commit logic 60 (FIG. 2) is configured to initiate (block 314, FIG. 8) a safe data commit scan of cache to identify tracks of modified data to destage to storage.

In accordance with one aspect of the present description, destaging of the tracks of modified data in cache may be bypassed in connection with the safe data commit scan for identified tracks of sequential write operations which are candidates for stride-aligned copy source to target operations as described above in connection with FIG. 3B. Thus, instead of immediately destaging pursuant to the safe data commit scan, a task control block may be generated to control a stride-aligned copy source to target operation for such sequential write operation. Subsequent to the completion of a stride-aligned copy source to target operation, the modified tracks in cache for the sequential write operation may be destaged to the point-in-time copy source in a manner similar to that described above in connection with the write completion operation (block 244) of FIG. 5 to complete the safe data commit operations.

Figure 8:
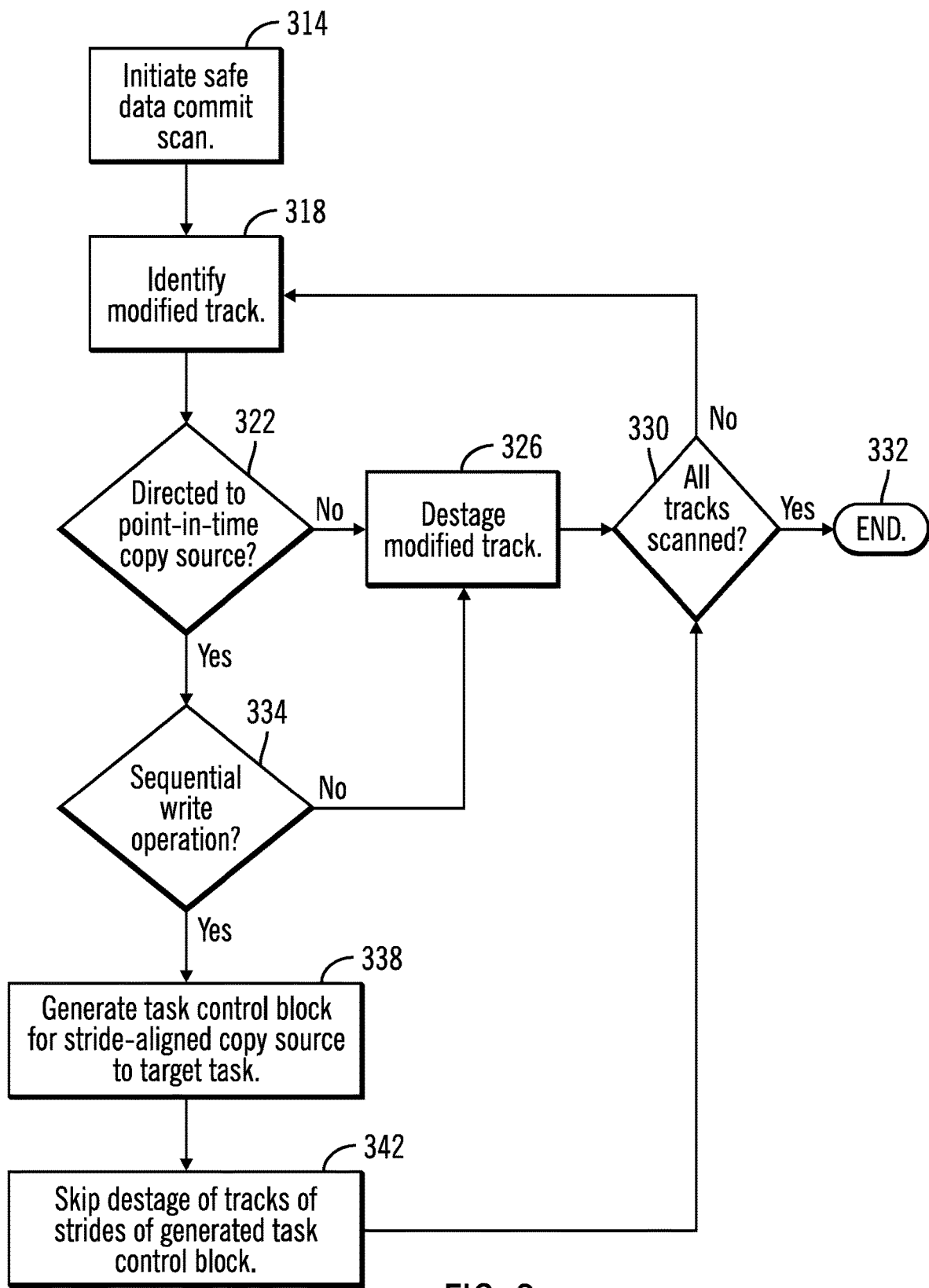
FIG. 8 illustrates an example of safe data commit scan operations in accordance with one aspect of the present description.

Referring to FIGS. 2 and 8, the safe data commit logic 60 (FIG. 2) is configured to initiate (block 314, FIG. 8) a safe data commit scan of cache to identify (block 318) tracks of modified data to destage to storage. In response to identification (block 318, FIG. 8) of a track of modified data in cache, the copy source to target logic 214 (FIG. 6) is configured to determine (block 322, FIG. 8) whether the identified modified track in cache relates to a point-in-time copy relationship such that the track corresponds to a track of a point-in-time copy source such as the source 50 of FIG. 3B. For example, a modified track in cache is directed to or corresponds to a point-in-time copy source if the modified track when destaged to storage, is destaged to a point-in-time source. For a modified track in cache which corresponds to a point-in-time copy source, the sequential write detection logic 234 (FIG. 6) is configured to detect (block 324, FIG. 5) whether the modified track was written in connection with a sequential write operation such that the modified track is part of a sequence of sequential modified tracks in cache. It is appreciated that such a determination may be made using a variety of techniques, depending upon the particular application, as discussed above in connection with block 240 of FIG. 5.

If it is determined (block 322, FIG. 8) that the identified modified track in cache does not correspond to a point-in-time copy source, or if it is determined (block 334) that the identified track is not part of a sequence of sequential, modified tracks, the modified track may be subsequently destaged (block 326) to storage and a determination (block 330) is made as to whether all tracks of the safe data commit scan have been scanned. If so, the safe data commit scan is complete (block 332). Conversely, if is determined (block 330) that all tracks of the safe data commit scan have not been scanned, another modified track in cache is identified (block 318, FIG. 8).

If it is determined (block 322, FIG. 8) that the identified modified track in cache does correspond to a point-in-time copy source, and if it is determined (block 334) that the identified track is part of a sequence of sequential, modified tracks written to cache, the task control block generation logic 250 (FIG. 6) is configured to generate (block 338) a task control block data structure similar to the TCB 218 (FIG. 7), to control a stride-aligned copy source to target operation for the sequence of modified tracks directed to the point-in-time copy source. Having generated the task control block for the stride-aligned copy source to target operation for the sequence of modified tracks directed to the point-in-time copy source, the safe data commit logic 60 may be configured to skip (block 342) or bypass the sequence of modified tracks directed to the point-in-time copy source instead of immediately destaging those tracks to storage. For the bypassed tracks of the safe data commit scan, the generated stride-aligned TCBs 218 may be dispatched to perform stride-aligned copy source to target operations in a manner similar to that depicted in FIG. 3B and as described in connection with blocks 260, 274, 284 and 288 of FIG. 5. Following completion of stride-aligned copy source to target operations for the bypassed (block 342) sequential tracks, the sequential tracks may be destaged to the point-in-time source in a manner similar to that described above in connection with block 244 of FIG. 5, to complete the sequential write operations and the safe data commit for those write operations.

Once it is determined (block 330) that all tracks of the safe data commit scan have been scanned, the safe data commit scan is complete (block 332). Conversely, if not all modified tracks of the safe data commit scan operation have been scanned, another modified track in cache is identified (block 314) until all modified tracks in cache have been scanned. A safe data commit scan in cache may be made with respect to all tracks in cache, or on a rank by rank basis, or with respect to other subdivisions of the cache, depending upon the particular application.

Figure 9:
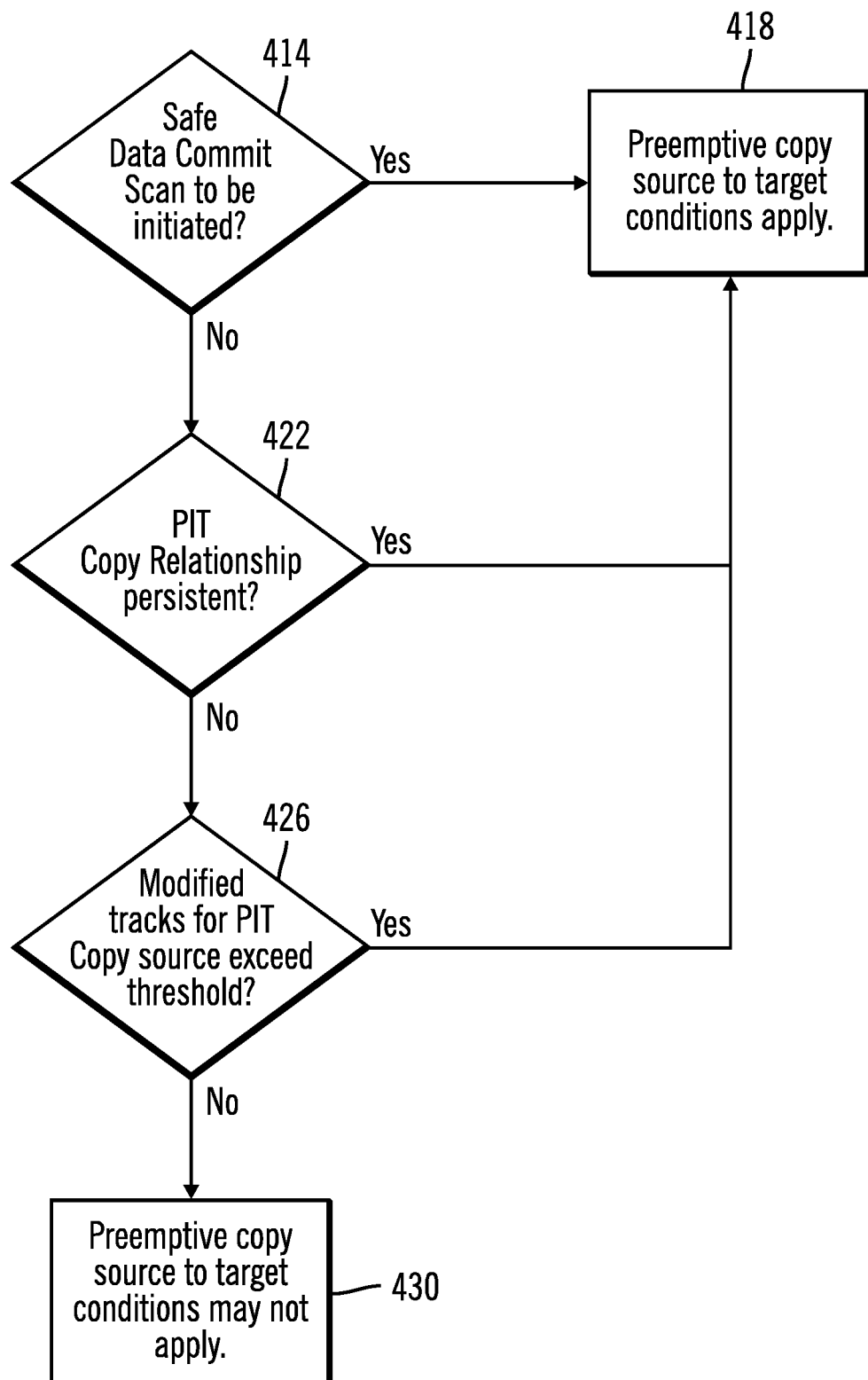
FIG. 9 illustrates an example of determination of preemptive conditions for copy source to target operations in accordance with one aspect of the present description.

FIG. 9 is directed to an example of operations for determining whether conditions exist for preemptive copy source to target operations in accordance with one aspect of the present description. As previously mentioned, in one aspect of the present description, the target destage logic 33 (FIG.

2) may be configured to selectively and preemptively perform copy source to target operations, depending upon conditions which indicate whether such copy source to target operations remain appropriate or have been obviated by other occurrences.

In one embodiment, a copy source to target operation may be performed preemptively at any point, from the time a write operation intended for a point-in-time source is initiated, to a time before the track of the write operation is destaged to the source which overwrites the corresponding unmodified data of the source. In another embodiment, a copy source to target operation may be performed preemptively but more selectively so as to further improve system performance by performing the copy source to target operation ahead of source destaging so that source destaging is not delayed by the copy source to target operation. Conversely by not performing a preemptive copy source to target operation in conditions which indicate that copy source to target operations may not be appropriate, degradation of system performance by unneeded preemptive operations may be reduced or eliminated.

Figure 6:
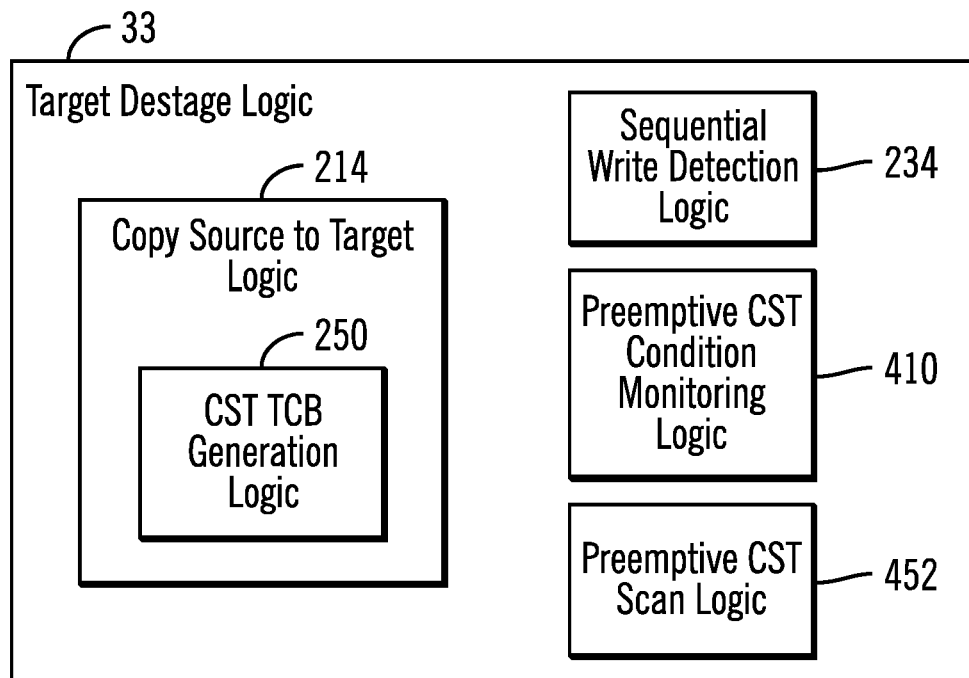
FIG. 6 illustrates an example of target destage logic in the storage system of FIG. 2.
Figure 7:
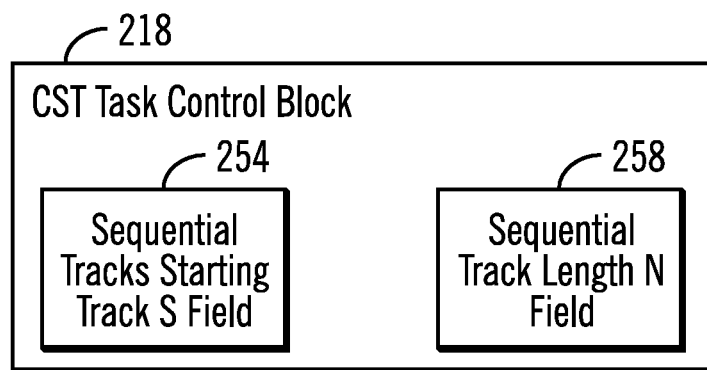
FIG. 7 illustrates an example of a task control block data structure for controlling copy source to target operations in accordance with one embodiment of the present description.

Referring to FIGS. 2, 6 and 9, preemptive condition monitoring logic 410 (FIG. 6) of the target destage logic 33 is configured to determine whether conditions for preemptive copy source to target operation are present, including determining (block 414, FIG. 9) if a safe data commit scan is about to be initiated. A safe data commit scan by the safe data commit logic 60 (FIG. 2) identifies tracks of modified data in cache for purposes of destaging the identified modified tracks to storage. Since all modified tracks in cache will be destaged to storage which will overwrite unmodified data in the point-in-time copy sources in storage, it is determined (block 418) that a condition for preemptive copy source to target operations is present. In one embodiment, the preemptive condition monitoring logic 410 is further configured to determine that conditions for preemptive copy source to target operations are present an interval of time (represented by the value "delta X") prior to initiation of a safe data commit scan of cache to identify tracks of modified data in cache to destage to storage.

Figure 10:
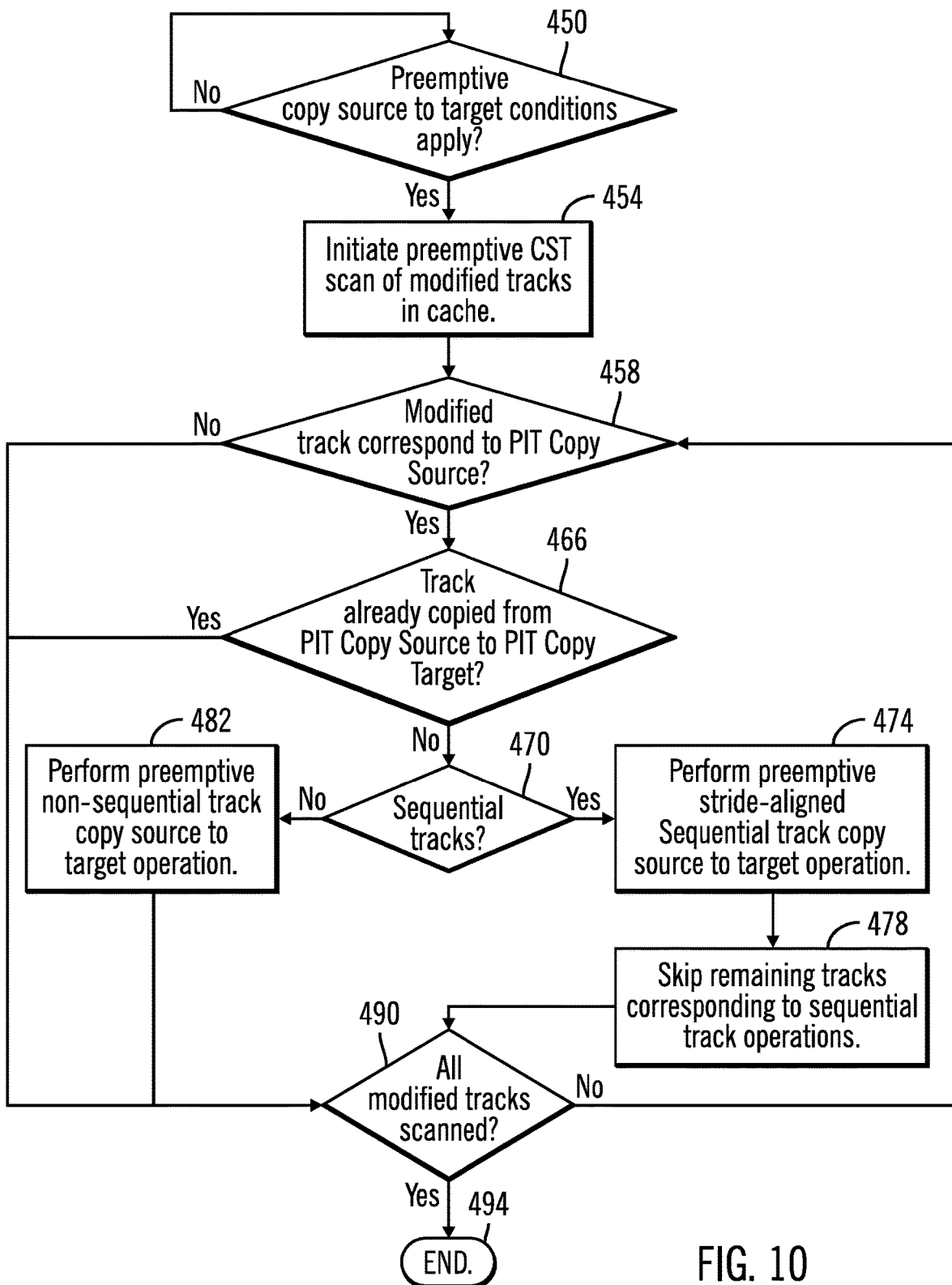
FIG. 10 depicts an example of a preemptive copy source to target scan in accordance with one aspect of the present description.

In response to a determination (block 418) that a condition for preemptive copy source to target operations is present, preemptive scan logic 420 (FIG. 6) of the target destage logic 33 can initiate a scan of modified tracks in cache to determine if a preemptive copy source to target operation is appropriate for each modified track in cache. FIG. 10 depicts an example of a preemptive copy source to target scan of cache in accordance with one aspect of the present description. In one embodiment, the preemptive copy source to target scan of modified tracks in cache may be initiated at least a certain interval of time (delta X) prior to start of the safe data commit scan to provide sufficient time for the preemptive copy source to target scan and any resultant preemptive copy source to target operations to be completed before destaging of modified tracks to the sources begins as part of a subsequent safe data commit scan.

The preemptive condition monitoring logic 410 (FIG. 6) is further configured to determine whether conditions for preemptive copy source to target operations are present as a function of whether (block 422, FIG. 9), there is a point-in-time copy relationship between a point-in-time copy source and a point-in-time copy target, which has modified data in the cache and if so, whether the point-in-time copy relationship is persistent. As previously mentioned, a persistent point-in-time copy relationship is one in which the point-in-time of the copy relationship has not changed. An example of a non-persistent point-in-time copy relationship is one in which the point-in-time of the copy relationship has been incremented subsequent to the write operation to cache. It is appreciated that if the point-in-time copy relationship is not persistent, that is, the point-in-time of the relationship has been incremented, any modified tracks written to cache for the copy relationship before the relationship is incremented, belong to the incremented relationship and supersede any corresponding unmodified data in the source. Thus, the corresponding unmodified data in the source may be discarded by permitting a destage to the corresponding tracks of the source without preserving the unmodified data of the tracks in a preemptive copy source to target operation. Hence, a preemptive copy source to target operation is not needed and it may be determined that conditions for preemptive copy source to target operation are not present for that incremented copy relationship.

Conversely, if the point-in-time copy relationship is persistent, any modified tracks in cache that are in the point-in-time copy relationship do not belong to an incremented copy relationship and do not supersede corresponding unmodified data in the source. Thus, the corresponding unmodified data in the source is to be preserved by a preemptive copy source to storage operation before the unmodified data is overwritten by a destage operation to the source. Hence, the preemptive copy source to target operation is appropriate and it may be determined (block 418, FIG. 9) that conditions for preemptive copy source to target operation are present.

As noted above, in one embodiment, a copy source to target operation may be performed preemptively at any point in the interval from the time a write operation intended for a point-in-time source is initiated, to a time before the track of the write operation is destaged from cache to the source which overwrites the corresponding unmodified data of the source. Hence, if it is determined (block 418, FIG. 9) that conditions for preemptive copy source to target operation are present because it is determined (block 422, FIG. 9) that a modified track in cache belongs to a persistent point-in-time copy relationship, the preemptive scan logic 420 (FIG. 6) of the target destage logic 33 can subsequently initiate at any time a scan of modified tracks in cache to determine if a preemptive copy source to target operation is appropriate for each modified track in cache. However, in one embodiment, such a scan could be initiated at least a certain interval of time (delta X) prior to start of a subsequent safe data commit scan to provide sufficient time for the preemptive copy source to target scan and any resultant preemptive copy source to target operations to be completed before destaging of modified tracks to the sources begins as part of the safe data commit scan.

The preemptive condition monitoring logic 410 (FIG. 6) is further configured to determine whether conditions for preemptive copy source to target operation are present as a function of whether (block 426) the number of tracks of modified data in cache which belong to a point-in-time copy relationship, that is, correspond to a point-in-time copy source, exceeds a threshold value. It is appreciated that if the number of tracks of modified data in cache which correspond to a point-in-time copy source, exceeds a threshold value, non-preemptive copy source to target operations performed in conjunction with copy-on-destage operations, for example, may due to their relatively high number, impose a substantial penalty on system performance. Such a degradation of system performance may be ameliorated by performing copy source to target operations preemptively in advance of destaging operations such that the destaging operations when eventually performed, need not wait for completion of copy source to target operations before the source destage operations may be completed. Hence, in the embodiment of FIG. 9, it is determined (block 418, FIG. 9) that conditions for preemptive copy source to target operation are present if the number of tracks of modified data in cache which belong to a point-in-time copy relationship, exceeds (block 426) the threshold value.

A suitable threshold value may be selected using a variety of techniques depending upon the particular application. For example, a suitable threshold value may be expressed in terms of a percentage of the total capacity of the cache as a whole or of each rank if scans are performed on a rank by rank basis. An example of a suitable threshold value may be 70% or in a range of 70 to 100% of total capacity of the cache or of the cache for a rank, as appropriate.

Here too, if it is determined (block 418, FIG. 9) that conditions for preemptive copy source to target operation are present because it is determined that the number of tracks of modified data in cache which belong to a point-in-time copy relationship, exceeds (block 426) the threshold value, the preemptive scan logic 420 (FIG. 6) of the target destage logic 33 can subsequently initiate at any time a scan of modified tracks in cache to determine if a preemptive copy source to target operation is appropriate for each modified track in cache, but preferably at least a certain interval of time (delta X) prior to start of a subsequent safe data commit scan as discussed above.

Conversely, if it is determined (block 414, FIG. 9) that a safe data commit scan is not about to be initiated, and it is determined (block 422) that the point-in-time copy relationships represented by modified tracks in cache are not persistent, and it is determined (block 426) that the number of tracks of modified data in cache which correspond to a point-in-time copy source, does not exceed the threshold value, it is determined (block 430, FIG. 9) in one embodiment that conditions for preemptive copy source to target operation are not present. Accordingly, a scan of modified tracks in cache to determine if a preemptive copy source to target operation is appropriate for each modified track in cache, may be bypassed. However, it is appreciated that in other embodiments, various tests may be added, substituted or removed in a determination as to whether or not conditions for preemptive copy source to target operations are present.

FIG. 10 depicts one example of a scan of modified tracks in cache to determine if a preemptive copy source to target operation is appropriate for each modified track in cache. Accordingly, preemptive condition monitoring logic 410 (FIG. 6) determines (block 450, FIG. 10) whether conditions for preemptive copy source to target operation are present as described above in connection with FIG. 9. Preemptive scan logic 452 (FIG. 6) is configured to, in response to a determination that conditions for preemptive copy source to target operation are present, initiate (block 454, FIG. 10) a scan of tracks of modified data in cache to identify and select tracks of modified data in cache for preemptive copy source to target operations.

In one embodiment, the preemptive scan logic 452 (FIG. 6) is configured to identify a modified track of data in cache and determine (block 458, FIG. 10) whether the track of modified data in cache corresponds to a point-in-time copy source, that is, belongs to a point-in-time copy relationship. The preemptive scan logic 452 (FIG. 6) is further configured to, if it is determined that the identified modified track of data in cache belongs to a point-in-time copy relationship, also determine (block 458, FIG. 10) whether unmodified data in the corresponding tracks of the point-in-time copy source has already been copied from the point-in-time copy source to the corresponding point-in-time copy target of the relationship. If not, a preemptive copy source to target operation may be initiated to preemptively copy the unmodified data from the corresponding tracks in the point-in-time copy source to the point-in-time copy target in advance of a subsequent source destage operation.

As described above in connection with FIGS. 5 and 7, a stride-aligned copy source to target operation may be performed for sequential tracks of a sequential write operation. Accordingly, the preemptive scan logic 452 (FIG. 6) is further configured to determine (block 470) if the identified track is part of a sequence of sequential tracks of modified data. If so, the preemptive scan logic 452 (FIG. 6) is further configured to cause (block 474, FIG. 10) the copy source to target logic 214 (FIG. 6) to perform a preemptive stride-aligned copy source to target operation, for corresponding sequential tracks of the point-in-time copy target. Accordingly, a task control block 218 (FIG. 7) identifying a sequence of sequential tracks may be generated in a manner similar to that described above in connection with block 338 of FIG. 8.

Having generated the task control block for the stride-aligned copy source to target operation for the sequence of modified tracks directed to the point-in-time copy source, the preemptive scan logic 452 (FIG. 6) may be configured to skip (block 478) or bypass in cache the remaining sequential tracks of the sequence of modified tracks for which the sequential task control block was generated, in a manner similar to that described above in connection with block 342 of FIG. 8. Upon subsequent dispatch of the generated sequential task control block 218, a stride-aligned copy source to target operation may be preemptively performed for corresponding sequential tracks as identified by the sequential task control block in a manner similar to that described above in connection with blocks 260-288 and 244 of FIG. 5.

Conversely, if the preemptive scan logic 452 (FIG. 6) determines (block 470) that the identified track is not part of a sequence of sequential tracks of modified data, the preemptive scan logic 452 (FIG. 6) is further configured to cause (block 482, FIG. 10) the copy source to target logic 214 (FIG. 6) to preemptively perform a non-sequential copy source to target operation, for a corresponding non-sequential track of the point-in-time copy relationship. Accordingly, a non-sequential task control block 218 (FIG. 7) may be generated for as few as a single track, for example. If the preemptive copy source to target operation is for a single track, the starting track value S (field 254) of a non-sequential task control block 218 (FIG. 7) may identify the single track and the number of tracks value N (field 258) may be set to one for a single track non-sequential preemptive copy source to target operation. It is appreciated that a variety of formats may be utilized for non-sequential and sequential task control blocks in accordance with the present description. For example, multiple non-sequential tracks may be identified by suitable fields of a non-sequential task control block for a preemptive copy source to target operation.

Upon subsequent dispatch of the non-sequential track task control block, the non-sequential preemptive copy source to target operation may be preemptively performed. In one embodiment, a non-sequential preemptive copy source to target operation need not be stride-aligned since as few as one track may be the subject of the preemptive copy source to target operation. FIG. 3A depicts an example of a non-sequential copy source to target operation for a single track pursuant to a task control block configured for a single track as described above. However, it is appreciated that non-sequential copy source to target operations may be directed to multiple, non-sequential copy source to target operations using one or more task control blocks configured for multiple non-sequential tracks as described above.

Accordingly, the copy source to target logic 214 (FIG. 6) is configured to initiate a non-sequential copy source to target operation (FIG. 3A) using a task control block 218 (FIG. 7) configured for a non-sequential track wherein the non-sequential copy source to target operation includes directing a read operation 484 (FIG. 3A) to a point-in-time copy source 50 (FIG. 3A) because the data of the read operation has not yet been copied to the point-in-time copy target 54. Accordingly, the read operation 484 obtains unmodified read data from a track of the source 50 corresponding to the identified track in cache containing modified data to be eventually destaged to overwrite the corresponding track in the source 50.

The unmodified data read from the source 50 pursuant to the read operation 484 is staged by a stage operation 486 in the cache 28 by the copy source to target logic 214 (FIG. 6). The copy source to target logic 214 is further configured to write in a destage operation 488 (FIG. 3A) the unmodified data read from the source 50, to the corresponding track of the target 54 from the cache 28.

Once it is determined (block 490, FIG. 10) that all modified tracks of the cache have been scanned, the preemptive scan is complete (block 494). Alternatively, another modified track in cache is identified (block 458) and examined for suitability for a preemptive copy source to target operation as described above until all modified tracks in cache have been scanned. A preemptive scan in cache may be made with respect to all tracks in cache, or on a rank by rank basis, or with respect to other subdivisions of the cache.

Following completion of sequential (stride-aligned) and non-sequential (e.g. single track) preemptive copy source to target operations, a safe data commit scan of cache may be initiated by safe data commit logic 60 (FIG. 2) to destage tracks of modified data from cache to storage. However, because copy source to target operations have already been selectively and preemptively completed for modified tracks belonging to point-in-time copy relationships, destaging of modified tracks to point-in-time copy sources may proceed without waiting for completion of copy source to target operations to preserve the unmodified data of corresponding tracks in the source before being overwritten by the destage to source operations. Moreover, because the preemptive copy source to target operations are performed selectively when it has been determined that advantageous conditions for preemptive copy source to target operations are present, any degradation of system performance due to such preemptive operations may be reduced or eliminated. Other aspects and advantages may be realized, depending upon the particular application.

Figure 11:
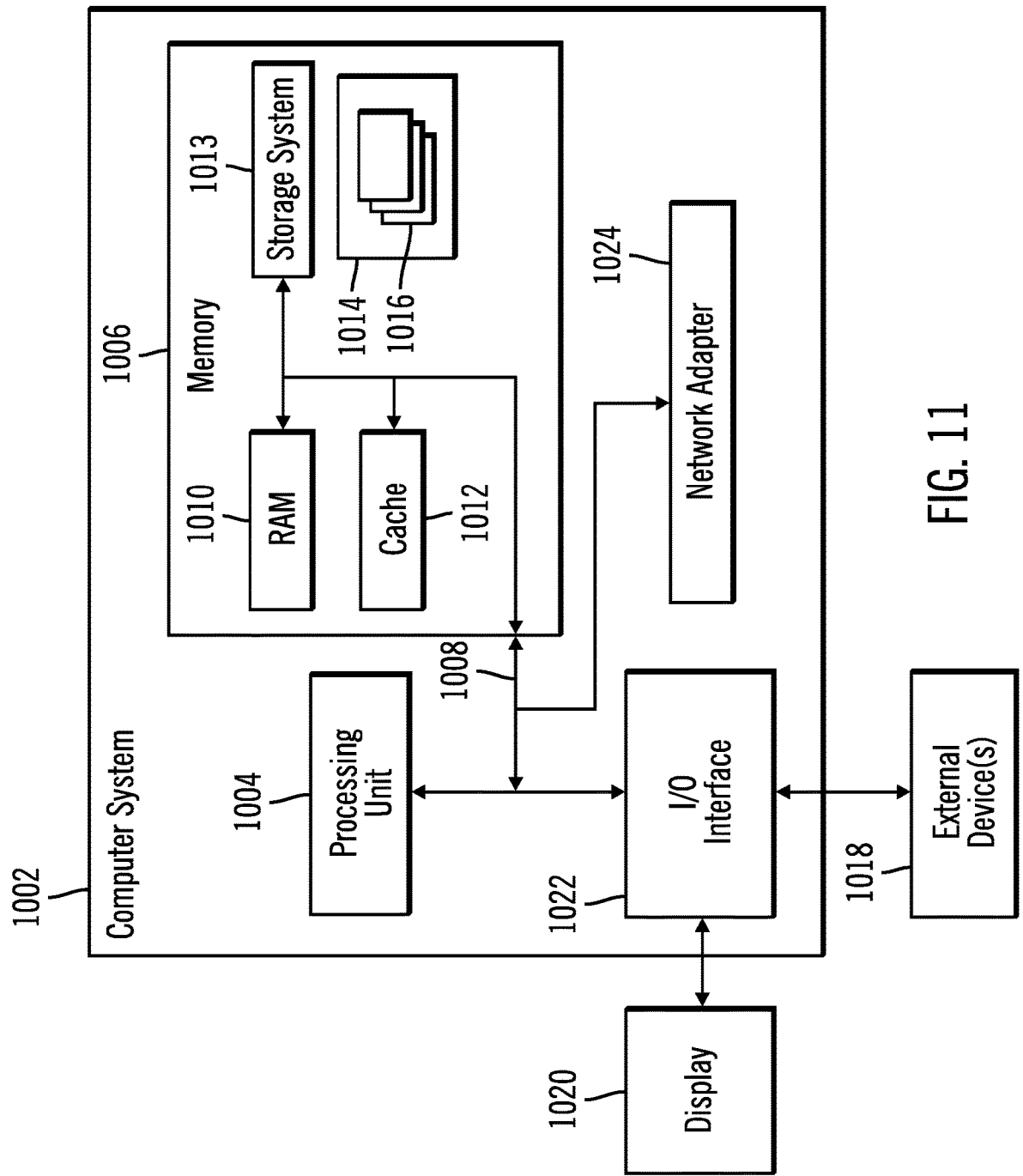
FIG. 11 illustrates a computer embodiment employing copy source to target management in a data storage system in accordance with the present description.

The computational components of the figures may each be implemented in one or more computer systems, such as the computer system 1002 shown in FIG. 11. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    writing a modified set of data for a point-in-time copy source to a cache wherein the modified set of data is modified with respect to an unmodified set of data in the point-in-time copy source; and
    prior to initiation of a safe data commit scan of the cache to identify tracks of modified data in the cache to destage to storage, preemptively and selectively initiating a copy source to target operation which includes:
    reading the point-in-time copy source to obtain read data including the unmodified set of data; and
    writing the unmodified set of data to a point-in-time copy target; and
    initiating a scan of the cache to identify tracks of modified data in the cache to destage to storage.

2. The method of claim 1 further comprising determining whether conditions for preemptive copy source to target operations are present for modified data in the cache including determining that conditions for preemptive copy source to target operation are present an interval of time prior to initiation of a safe data commit scan of the cache to identify tracks of modified data in the cache to destage to storage.

3. The method of claim 2 wherein determining whether conditions for preemptive copy source to target operations are present for modified data in the cache includes determining whether conditions for preemptive copy source to target operations are present for modified data in the cache as a function of whether a point-in-time copy relationship from the point-in-time copy source to the point-in-time copy target is persistent or the point-in-time of the copy relationship has been incremented wherein it is determined that conditions for preemptive copy source to target operation are present if the point-in-time copy relationship from the point-in-time copy source to the point-in-time copy target is persistent.

4. The method of claim 2 wherein determining whether conditions for preemptive copy source to target operations are present for modified data in the cache includes determining whether conditions for preemptive copy source to target operations are present for modified data in the cache as a function of whether the number of tracks of modified data in the cache which correspond to a point-in-time copy source, exceeds a threshold value wherein it is determined that conditions for preemptive copy source to target operation are present if the number of tracks of modified data in the cache which correspond to a point-in-time copy source, exceeds the threshold value.

5. The method of claim 2 further comprising, in response to a determination that conditions for preemptive copy source to target operation are present, initiating a scan of tracks of modified data in the cache to identify tracks of modified data which a) correspond to a point-in-time copy source, and b) have not yet been copied to a corresponding point-in-time copy target of the point-in-time source, and selectively and preemptively initiating a copy source to target operation for identified tracks in the cache.

6. The method of claim 5 wherein data is written to the point-in-time copy source in strides and data is written to the point-in-time copy target in strides and wherein initiating a copy source to target operation for identified tracks in the cache includes:
    detecting if identified tracks in the cache are sequential, and in response to detection of identified sequential tracks, preemptively and selectively:
    directing a stride-aligned read operation to a point-in-time copy target of the point-in-time copy source to force a redirected read operation to the point-in-time copy source to obtain unmodified data corresponding to the identified sequential tracks of modified data in the cache; and writing stride-aligned tracks of sequential data to point-in-time copy target including the obtained unmodified data corresponding to the identified sequential tracks of modified data in the cache.

7. The method of claim 6 wherein the scan of tracks of modified data in the cache includes bypassing scanning of remaining tracks corresponding to the stride-aligned read operation.

8. A system, comprising:
a host configured to initiate input/output operations;
a storage controller having a processor and a cache; and
storage controlled by the storage controller, the storage including a point-in-time copy source and a point-in-time copy target;
wherein the storage controller includes:
storage manager logic configured to write a modified set of data for a point-in-time copy source to the cache wherein the modified set of data is modified with respect to an unmodified set of data in the point-in-time copy source, the storage manager logic further comprising:
copy source to target logic configured to, prior to initiation of a safe data commit, scan of the cache to identify tracks of modified data in the cache to destage to storage, preemptively and selectively initiate a copy source to target operation which includes:
reading the point-in-time copy source to obtain read data including the unmodified set of data; and
writing the unmodified set of data to the point-in-time copy target; and
safe data commit logic configured to initiate a scan of the cache to identify tracks of modified data in the cache to destage to storage.

9. The system of claim 8 further comprising preemptive condition monitoring logic configured to determine whether conditions for preemptive copy source to target operations are present for modified data in the cache including determining that conditions for preemptive copy source to target operation are present an interval of time prior to initiation of a safe data commit scan of the cache to identify tracks of modified data in the cache to destage to storage.

10. The system of claim 9 wherein the preemptive condition monitoring logic is further configured to determine whether conditions for preemptive copy source to target operation are present as a function of whether a point-in-time copy relationship from the point-in-time copy source to the point-in-time copy target is persistent or the point-in-time of the copy relationship has been incremented wherein it is determined that conditions for preemptive copy source to target operation are present if the point-in-time copy relationship from the point-in-time copy source to the point-in-time copy target is persistent.

11. The system of claim 9 wherein writing a modified set of data in the cache includes writing modified data in tracks and wherein the preemptive condition monitoring logic is further configured to determine whether conditions for preemptive copy source to target operation are present as a function of whether the number of tracks of modified data in the cache which correspond to a point-in-time copy source, exceeds a threshold value wherein it is determined that conditions for preemptive copy source to target operation are present if the number of tracks of modified data in the cache which correspond to a point-in-time copy source, exceeds the threshold value.

12. The system of claim 9 wherein writing a modified set of data in the cache includes writing modified data in tracks, the storage manager logic further comprising preemptive scan logic configured to, in response to a determination that conditions for preemptive copy source to target operation are present, initiate a scan of tracks of modified data in the cache to identify tracks of modified data which a) correspond to a point-in-time copy source, and b) have not yet been copied to a corresponding point-in-time copy target of the point-in-time source, and selectively and preemptively cause the copy source to target logic to initiate a copy source to target operation for identified tracks in the cache.

13. The system of claim 12 wherein data is written to the point-in-time copy source in strides and data is written to the point-in-time copy target in strides, the storage manager logic further comprising sequential write detection logic configured to detect if identified tracks in the cache are sequential, wherein the copy source to target logic is further configured to in response to detection of identified sequential tracks, preemptively and selectively direct a stride-aligned read operation to a point-in-time copy target of the point-in-time copy source to force a redirected read operation to the point-in-time copy source to obtain unmodified data corresponding to the identified sequential tracks of modified data in the cache, and write stride-aligned tracks of sequential data to point-in-time copy target including the obtained unmodified data corresponding to the identified sequential tracks of modified data in the cache.

14. The system of claim 13 wherein the preemptive scan logic is further configured to bypass scanning of remaining tracks corresponding to the stride-aligned read operation.

15. A computer program product for use with a host and a data storage system having a storage controller having a processor and a cache, and storage controlled by the storage controller, the storage including a point-in-time copy source and a point-in-time copy target, wherein the computer program product comprises a computer readable storage medium having program instructions embodied therewith, the program instructions executable by a processor of the storage controller to cause processor operations, the processor operations comprising:
writing a modified set of data for a point-in-time copy source to the cache wherein the modified set of data is modified with respect to an unmodified set of data in the point-in-time copy source; and
prior to initiation of a safe data commit, scan of the cache to identify tracks of modified data in the cache to destage to storage, preemptively and selectively initiating a copy source to target operation which includes:
reading the point-in-time copy source to obtain read data including the unmodified set of data; and
writing the unmodified set of data to the point-in-time copy target; and
initiating a scan of the cache to identify tracks of modified data in the cache to destage to storage.

16. The computer program product of claim 15 wherein the processor operations further comprising determining whether conditions for preemptive copy source to target operations are present for modified data in the cache including determining that conditions for preemptive copy source to target operation are present an interval of time prior to initiation of a safe data commit, scan of the cache to identify tracks of modified data in the cache to destage to storage.

17. The computer program product of claim 16 wherein determining whether conditions for preemptive copy source to target operations are present for modified data in the cache includes determining whether conditions for preemptive copy source to target operations are present for modified data in the cache as a function of whether a point-in-time copy relationship from the point-in-time copy source to the point-in-time copy target is persistent or the point-in-time of the copy relationship has been incremented wherein it is determined that conditions for preemptive copy source to target operation are present if the point-in-time copy relationship from the point-in-time copy source to the point-in-time copy target is persistent.

18. The computer program product of claim 16 wherein determining whether conditions for preemptive copy source to target operations are present for modified data in the cache includes determining whether conditions for preemptive copy source to target operations are present for modified data in the cache as a function of whether the number of tracks of modified data in the cache which correspond to a point-in-time copy source, exceeds a threshold value wherein it is determined that conditions for preemptive copy source to target operation are present if the number of tracks of modified data in the cache which correspond to a point-in-time copy source, exceeds the threshold value.

19. The computer program product of claim 16 further comprising, in response to a determination that conditions for preemptive copy source to target operation are present, initiating a scan of tracks of modified data in the cache to identify tracks of modified data which a) correspond to a point-in-time copy source, and b) have not yet been copied to a corresponding point-in-time copy target of the point-in-time source, and selectively and preemptively initiating a copy source to target operation for identified tracks in the cache.

20. The computer program product of claim 19 wherein data is written to the point-in-time copy source in strides and data is written to the point-in-time copy target in strides and wherein initiating a copy source to target operation for identified tracks in the cache includes:

detecting if identified tracks in the cache are sequential, and in response to detection of identified sequential tracks, preemptively and selectively:

directing a stride-aligned read operation to a point-in-time copy target of the point-in-time copy source to force a redirected read operation to the point-in-time copy source to obtain unmodified data corresponding to the identified sequential tracks of modified data in the cache; and writing stride-aligned tracks of sequential data to point-in-time copy target including the obtained unmodified data corresponding to the identified sequential tracks of modified data in the cache.

21. The computer program product of claim 20 wherein the scan of tracks of modified data in the cache includes bypassing scanning of remaining tracks corresponding to the stride-aligned read operation.

\* \* \* \* \*